US012646493B1

(12) United States Patent
De BROUWER et al.

(10) Patent No.: US 12,646,493 B1
(45) Date of Patent: Jun. 2, 2026

(54) PERSONALIZED COVER-VOICE MUSIC SYNTHESIS SYSTEM

(71) Applicant: Sound Patrol Inc., Los Angeles, CA (US)

(72) Inventors: Walter Adolf De BROUWER, Malibu, CA (US); Ciprian Costin, Seattle, WA (US); Benjamin Ray Resnick, Plano, TX (US); Shubhr Singh, Ealing (GB)

(73) Assignee: Sound Patrol Inc., Los Angeles, CA (US)

( * ) Notice: Subject to any disclaimer, the term of this patent is extended or adjusted under 35 U.S.C. 154(b) by 0 days.

(21) Appl. No.: 19/305,380

(22) Filed: Aug. 20, 2025

(51) Int. Cl.
　G10H 1/00 (2006.01)
　G06F 21/60 (2013.01)
　G06Q 50/18 (2012.01)
　G10L 13/027 (2013.01)

(52) U.S. Cl.
　CPC ......... G10H 1/0025 (2013.01); G06F 21/602 (2013.01); G06Q 50/184 (2013.01); G10L 13/027 (2013.01); *G10H 2210/031* (2013.01); *G10H 2210/111* (2013.01)

(58) Field of Classification Search
　CPC ........... G10H 1/0025; G10H 2210/031; G10H 2210/111; G06F 21/602; G06Q 50/184; G10L 13/027
　See application file for complete search history.

(56) References Cited

U.S. PATENT DOCUMENTS

| | | | | |
|---|---|---|---|---|
| 5,750,912 A | * | 5/1998 | Matsumoto | G10L 21/00 |
| | | | | 704/E21.001 |
| 5,955,693 A | * | 9/1999 | Kageyama | G10H 5/005 |
| | | | | 84/610 |

| | | | | |
|---|---|---|---|---|
| 8,423,367 B2 | * | 4/2013 | Saino | G10H 1/0008 |
| | | | | 84/622 |
| 10,008,193 B1 | * | 6/2018 | Harvilla | G10H 1/20 |
| 11,257,480 B2 | * | 2/2022 | Yu | G10L 13/047 |
| 11,275,841 B2 | | 3/2022 | Poliakov | |
| 11,436,019 B2 | | 9/2022 | Pudipeddi et al. | |

(Continued)

FOREIGN PATENT DOCUMENTS

| | | | | | |
|---|---|---|---|---|---|
| CN | 110728592 A | * | 1/2020 | ........... | G06F 21/105 |
| CN | 118280324 A | * | 7/2024 | ........... | G10H 1/0008 |
| WO | WO-2021101665 A1 | * | 5/2021 | ........... | G10H 1/0025 |

OTHER PUBLICATIONS

John Thickstun et al., "Learning Features of Music From Scratch", ICLR Apr. 6, 2017, 14 pages.

(Continued)

*Primary Examiner* — Jeffrey Donels
(74) *Attorney, Agent, or Firm* — FP; Sikander M. Khan

(57) ABSTRACT

Cover music synthesis includes accessing a first digital song specified in a playlist of one or more digital songs, extracting, from the first digital song, first musical parameters characteristic of a music content of the first digital song, receiving a first vocal embedding indicative of a first singer, the first vocal embedding describing speech spoken by or vocals sung by the first singer, and using the first vocal embedding, generating first synthetic vocals for the first digital song using a vocal synthesis model, the first synthetic vocals matching the first musical parameters. The first synthetic vocals can be combined with a first music audio corresponding to the first digital song to generate a first synthetic song.

20 Claims, 10 Drawing Sheets

(56) References Cited

U.S. PATENT DOCUMENTS

| | | | |
|---|---|---|---|
| 11,605,369 B2 * | 3/2023 | Marchini | G10L 15/063 |
| 11,681,918 B2 | 6/2023 | Goswami et al. | |
| 11,842,287 B1 | 12/2023 | Rosenoer | |
| 11,961,233 B2 | 4/2024 | Liu | |
| 11,983,253 B2 * | 5/2024 | Goldston | G06Q 30/06 |
| 11,991,299 B1 | 5/2024 | Rosenoer | |
| 2002/0073098 A1 | 6/2002 | Zhang et al. | |
| 2003/0023421 A1 | 1/2003 | Finn et al. | |
| 2003/0177888 A1 | 9/2003 | Akahori et al. | |
| 2004/0006472 A1 * | 1/2004 | Kemmochi | G10L 13/033 |
| | | | 704/E13.004 |
| 2004/0030691 A1 | 2/2004 | Woo | |
| 2008/0190272 A1 | 8/2008 | Taub et al. | |
| 2008/0271592 A1 | 11/2008 | Beckford | |
| 2012/0167748 A1 | 7/2012 | Bao et al. | |
| 2013/0019738 A1 * | 1/2013 | Haupt | G10H 1/06 |
| | | | 84/622 |
| 2013/0305909 A1 | 11/2013 | Kwan | |
| 2015/0317965 A1 | 11/2015 | Horvath | |
| 2015/0339570 A1 | 11/2015 | Scheffler | |
| 2018/0374461 A1 * | 12/2018 | Serletic | H04N 9/8211 |
| 2021/0027761 A1 * | 1/2021 | Witherspoon | G06F 40/58 |
| 2022/0366022 A1 * | 11/2022 | Goldston | G06F 16/61 |
| 2022/0383258 A1 * | 12/2022 | Stewart | G10H 1/0033 |
| 2022/0398636 A1 * | 12/2022 | Fikes | G06Q 20/02 |
| 2023/0057082 A1 * | 2/2023 | Fabbro | G10L 17/02 |
| 2023/0316075 A1 | 10/2023 | Cella et al. | |
| 2024/0347037 A1 * | 10/2024 | Lee | G10L 13/047 |
| 2024/0404530 A1 * | 12/2024 | Meagher | G10L 17/26 |

OTHER PUBLICATIONS

Miranda Christ et al., "Undetectable Watermarks for Language Models", arXiv:2306.09194v1 [cs.CR] May 25, 2023, 32 pages.

Rishi Bommasani et al., "On the Opportunities and Risks of Foundation Models", Center for Research on Foundation Models (CRFM)Stanford Institute for Human-Centered Artificial Intelligence (HAI) Stanford University, 214 pages.

Rohith Kuditipudi et al., "Robust Distortion-free Watermarks for LanguageModels", Stanford Center for Research on Foundation Models, 2024, 10 pages.

Rohith Kuditipudi, "Robust Distortion-free Watermarks for Language Models", arXiv:2307.15593v3 [cs.LG] Jun. 6, 2024, 59 pages.

* cited by examiner

300

COMPUTER SYSTEM

400    HIGH PERFORMACE COMPUTING (HPC) SERVER

SYNTHETIC VOCAL GENERATION

GENERATE SYNTHETIC SONGS 900-2

USER INTERFACE

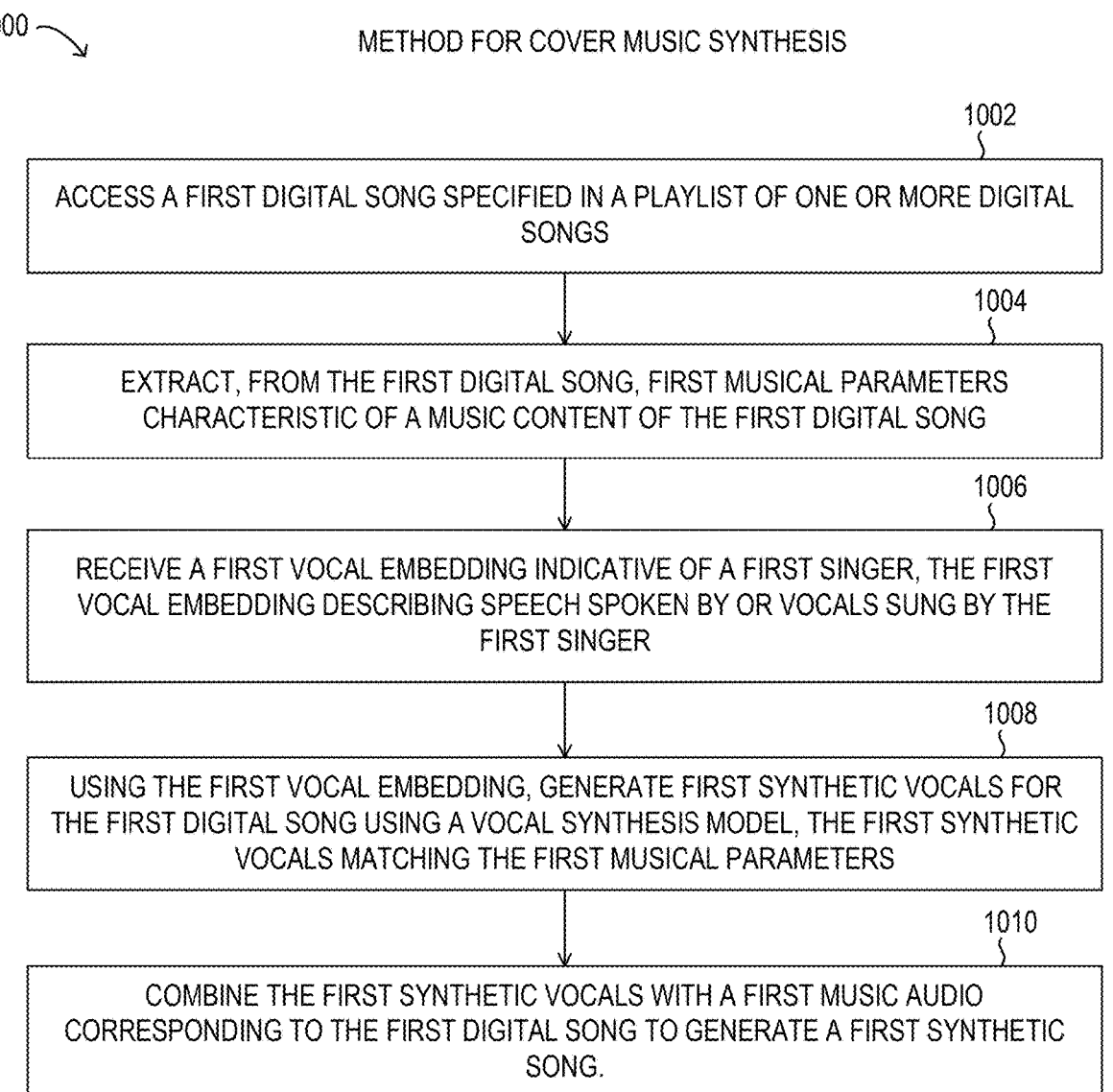

1000

METHOD FOR COVER MUSIC SYNTHESIS

1002

ACCESS A FIRST DIGITAL SONG SPECIFIED IN A PLAYLIST OF ONE OR MORE DIGITAL SONGS

1004

EXTRACT, FROM THE FIRST DIGITAL SONG, FIRST MUSICAL PARAMETERS CHARACTERISTIC OF A MUSIC CONTENT OF THE FIRST DIGITAL SONG

1006

RECEIVE A FIRST VOCAL EMBEDDING INDICATIVE OF A FIRST SINGER, THE FIRST VOCAL EMBEDDING DESCRIBING SPEECH SPOKEN BY OR VOCALS SUNG BY THE FIRST SINGER

1008

USING THE FIRST VOCAL EMBEDDING, GENERATE FIRST SYNTHETIC VOCALS FOR THE FIRST DIGITAL SONG USING A VOCAL SYNTHESIS MODEL, THE FIRST SYNTHETIC VOCALS MATCHING THE FIRST MUSICAL PARAMETERS

1010

COMBINE THE FIRST SYNTHETIC VOCALS WITH A FIRST MUSIC AUDIO CORRESPONDING TO THE FIRST DIGITAL SONG TO GENERATE A FIRST SYNTHETIC SONG.

FIG. 10

PERSONALIZED COVER-VOICE MUSIC SYNTHESIS SYSTEM

BACKGROUND

Field of the Disclosure

The present disclosure relates generally to artificial intelligence (AI)/machine learning (ML) for computational music analysis and, more particularly, to methods and systems for personalized cover-voice music synthesis.

Description of the Related Art

Data processing and computer science have seen a revolution in performance, accessibility, and learning ability with the advent of AI and machine learning (ML) systems based on neural network (NN) computing architectures. In particular, AI systems for audio generation include generative AI/ML models in music production that have been trained on extensive music corpora and are capable of music synthesis.

Typical AI systems for audio generation produce ad hoc songs according to parameters or certain stylistic criteria and often employ text-to-speech (TTS) systems that clone voices from speech input. The stylistic criteria are typically associated with style-transfer processes involving musical instrument digital interface (MIDI) stem and audio stem separation with subsequent remixing that can be time-consuming and resource intensive, and thus, economically undesirable. As a result, typical AI audio generation methods may not be particularly well integrated in terms of genre or stylistic aspects. Neither are such typical AI audio generation methods seamlessly integrated for use with playlist frameworks or stylistically curated music collections or libraries.

SUMMARY

In one aspect, a system for cover music synthesis is disclosed. The system may include a processor subsystem and memory media accessible to the processor subsystem storing. In the system, the instructions executable by the processor subsystem may be executable to access a first digital song specified in a playlist of one or more digital songs, extract, from the first digital song, first musical parameters characteristic of a music content of the first digital song, and receive a first vocal embedding indicative of a first singer, the first vocal embedding describing speech spoken by or vocals sung by the first singer. In the system, the instructions executable by the processor subsystem may further be executable to, using the first vocal embedding, generate first synthetic vocals for the first digital song using a vocal synthesis model, the first synthetic vocals matching the first musical parameters.

In any of the disclosed embodiments, the system may further include executable instructions to combine the first synthetic vocals with a first music audio corresponding to the first digital song to generate a first synthetic song.

In any of the disclosed embodiments of the system, the vocal synthesis model may include at least one of: a variational autoencoder (VAE), a diffusion model denoiser, a generative adversarial network (GAN), or a transformer-based sequence-to-sequence model.

In any of the disclosed embodiments of the system, the first musical parameters may be indicative of the music content and may describe at least one of: a lyric phoneme sequence, harmony, melody, musical structure, musical form, temporal dynamics, timbre, color, or orchestration.

In any of the disclosed embodiments of the system, the instructions to extract the musical parameters may further comprise instructions to extract the first musical parameters from symbolic music information for the music content of the first song, while the symbolic music information may be used to generate the first music audio.

In any of the disclosed embodiments the system may further include executable instructions to register the first synthetic song with at least one blockchain rights management system, while accessing the first digital song may further include encrypting the first digital song.

In another aspect, a computer-implemented method for cover music synthesis is disclosed. The method may include accessing a first digital song specified in a playlist of one or more digital songs, extracting, from the first digital song, first musical parameters characteristic of a music content of the first digital song, and receiving a first vocal embedding indicative of a first singer, the first vocal embedding describing speech spoken by or vocals sung by the first singer. The method may further include, using the first vocal embedding, generating first synthetic vocals for the first digital song using a vocal synthesis model, the first synthetic vocals matching the first musical parameters.

In any of the disclosed embodiments the method may further include combining the first synthetic vocals with a first music audio corresponding to the first digital song to generate a first synthetic song.

In any of the disclosed embodiments of the method, the vocal synthesis model may include at least one of: a variational autoencoder (VAE), a diffusion model denoiser, a generative adversarial network (GAN), or a transformer-based sequence-to-sequence model.

In any of the disclosed embodiments of the method, the first musical parameters may be indicative of the music content and may describe at least one of: a lyric phoneme sequence, harmony, melody, musical structure, musical form, temporal dynamics, timbre, color, or orchestration.

In any of the disclosed embodiments of the method, receiving the first vocal embedding indicative of the first singer may further include accessing a repository of multiple vocal embeddings, including the first vocal embedding, respectively corresponding to multiple singers, including the first singer, applying a clustering algorithm based on at least one of the first musical parameters or prosodic parameters for the vocal synthesis model to generate clusters of the vocal embeddings corresponding to clusters of the singers, selecting a first cluster of the vocal embeddings, and selecting the first vocal embedding from the first cluster.

In any of the disclosed embodiments of the method, the playlist may be stored with a music service, while accessing the first digital song may include accessing the first digital song using an application programming interface (API) compatible with the music service. In the method, the music service may provide at least one of music audio or music video.

In any of the disclosed embodiments the method may further include fine-tuning the vocal synthesis model using adaptation data of the first singer.

In any of the disclosed embodiments of the method, the first music audio may be based on the music content, or the first music audio may be generated using a music synthesis model.

In any of the disclosed embodiments the method may further include providing, to a user, a user interface configured for at least one of: selecting the playlist, selecting the first digital song, viewing and modifying prosodic parameters for the vocal synthesis model selected from at least one of: intonation, pitch, stress, emphasis, rhythm, timing, volume, or loudness, selecting the first vocal embedding, or selecting the first singer.

In any of the disclosed embodiments the method may further include receiving a second vocal embedding indicative of a second singer, and, using the first vocal embedding and the second vocal embedding, generating second synthetic vocals for the first digital song using the vocal synthesis model, the second synthetic vocals matching the first musical parameters.

In any of the disclosed embodiments the method may further include, using the first vocal embedding, generating one or more synthetic vocals respectively for the one or more digital songs using the vocal synthesis model, and combining the one or more synthetic vocals respectively with one or more music audios respectively corresponding to the one or more digital songs to generate respective one or more synthetic songs.

In any of the disclosed embodiments of the method, extracting the musical parameters may further include extracting the first musical parameters from symbolic music information for the music content of the first song, while the symbolic music information may be used to generate the first music audio.

In any of the disclosed embodiments the method may further include registering the first synthetic song with at least one blockchain rights management system, while accessing the first digital song may further include encrypting the first digital song.

In a further aspect, non-transitory memory media storing instructions for cover music synthesis are disclosed. In the memory media, the instructions may be executable by a processor to access a first digital song specified in a playlist of one or more digital songs, extract, from the first digital song, first musical parameters characteristic of a music content of the first digital song, receive a first vocal embedding indicative of a first singer, the first vocal embedding describing speech spoken by or vocals sung by the first singer, using the first vocal embedding, generate first synthetic vocals for the first digital song using a vocal synthesis model, the first synthetic vocals matching the first musical parameters, and combine the first synthetic vocals with a first music audio corresponding to the first digital song to generate a first synthetic song.

BRIEF DESCRIPTION OF THE DRAWINGS

For a more complete understanding of the present disclosure and its features and advantages, reference is now made to the following description, taken in conjunction with the accompanying drawings, in which:

FIG. 10 is a flow chart of a method for cover music synthesis, in one embodiment.

DESCRIPTION OF PARTICULAR EMBODIMENT(S)

Figures 1, 2:
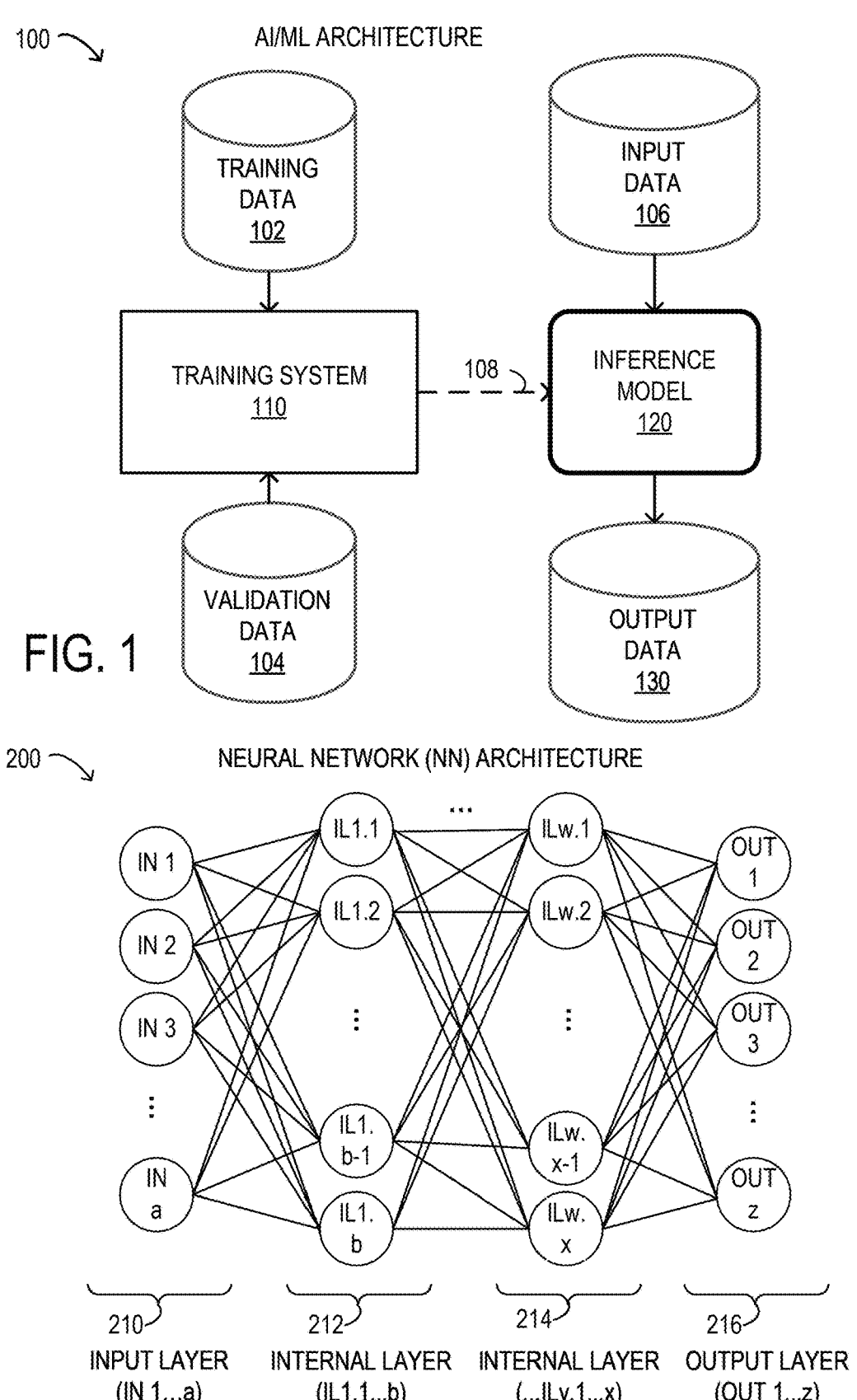
FIG. 1 is a depiction of an AI/ML architecture, in one embodiment.
FIG. 2 is a depiction of an NN architecture, in one embodiment.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As noted, typical AI audio generation methods for music synthesis may lack certain functionality that is involved with commercialization of music, and in particular, in commercialization of songs with music and vocal portions in particular genres or stylistic families. More specifically, owners or license holders of music song libraries may regularly be engaged in evaluating new musical songs for commercial release, as an ongoing activity in business development by music producing entities. Various criteria or factors may be involved in a business decision of which song genre or style to produce and release on the market at a given point in time. Such factors can include current musical trends of popular songs or song styles that can have a significant temporal market demand cycle. As a result, certain windows of production and release of certain types of songs may exist in market demand that are relatively short. Thus, if musical songs corresponding to demand fluctuations cannot be released for sale in a timely manner, the economic feasibility of such music commercialization efforts may be negatively impacted, which is not desirable.

In order to serve such fluctuating demand cycles, in addition to being able to presciently gage the market demand trendline, music releasing entities are faced with various business processes and tasks that can be beset with considerable delays to actually bring musical songs to the market, which is undesirable. Such business processes and tasks that are involved with timely music production of songs can include first identifying suitable genres or styles for new musical songs; finding, selecting and engaging suitable vocal artists for new songs; working with the selected vocal artists to compose, record, and produce new songs; and then going through the marketing and distribution process to release the new songs to the market. Each of these processes and tasks may be dependent on a prior process or task, such that any incremental delays can accumulate for a new release project to delay the market release. However, when the market release is no longer optimally synchronized with the market demand cycle that can be relatively short in comparison, due to delay at any point in the release project, potential revenue and profits can be negatively affected, which is commercially not desirable.

Among the more time-consuming portions of such a release project for the music releasing entity can be the selection of a suitable vocal artist for a desired cover song or album. Even when a suitable and currently in-demand style or genre has been identified, finding and selecting a suitably matching vocal artist can involve significant effort before a business decision can be made. In particular, the selection criteria for an ideal vocal artist can be substantially narrowed by the fact that, in addition to style or genre, the music releasing entity may preferentially desire to reproduce and re-release a new cover song for a music title that is already owned by the music releasing entity. Such newly re-released cover versions of owned song titles from an existing music library can have greater commercial potential for the music releasing entity by both resulting in increased demand and revenue for the original song title, as well as eliminating any licensing royalties that would otherwise be paid to other music owners for song titles owned by the other music owners.

As a result of the foregoing, it can be particularly desirable for the library-owning music releasing entity to be able to determine whether a particular vocal artist selected to sing a cover track for one or more songs in their library is suitable. However, in order to make such a decision to select the best suitable vocal artist, evaluation and assessment of the production-ready cover song version may be the preferred method. Therefore, when faced with such a weighty business decision, the music releasing entity may desire to select among one or more vocal artists singing the vocal portion for one or more new cover songs from their owned library, in order to have greater certainty of market success according to the presently fleeting market demand. Such business decisions in the music industry may be compounded in complexity when certain collections or combination albums are to be newly released. Further undesirable aspect of delays involved with cover vocal artist selection, as noted above, include a high opportunity cost of various resources involved in new cover song releases by the music releasing entity, including skilled management resources and time, artist time, studio time and equipment, and production time and equipment, among others. Therefore, a solution for reducing time-to-market by accelerating the evaluation of new cover songs by different vocal artists is desirable in the music industry.

In order to address the aforementioned issues, methods and systems for personalized cover-voice music synthesis are disclosed herein. In the methods and systems disclosed herein, a playlist can be accessed from a source location, such as a network storage location or a local storage location. In the methods and systems disclosed herein, for example, a user may designate a playlist, such as by specifying the playlist from a music service account of the user, or from a local or remote storage location for the user. The playlist may represent a digital audio source of one or more digital songs to be processed by the music synthesis system disclosed herein. The playlist may include a collection of songs of a particular genre or style, or songs having original vocals sung by a given vocal artist, among other similarities or common features.

In the methods and systems disclosed herein, musical parameters that are characteristic of respective musical portions for each digital song may be extracted by processing each digital song from a storage location. In this manner, the user may keep the playlist or the digital song private. In the methods and systems disclosed herein, a vocal embedding indicative of a singer may be retrieved or received. The vocal embedding may be generated from samples of speech spoken by or vocals sung by the singer and used by the music synthesis system to generate synthetic vocals for one or more of the digital songs. A vocal synthesis model that is an AI/ML model may generate the synthetic vocals using the vocal embedding and the musical parameters of each song in order to match the synthetic vocals to the musical portion of each digital song. In this manner, high quality synthetic vocals may be produced and subsequently combined with music audio corresponding to the musical portion of each respective digital song to generate a synthetic song. In some embodiments of the methods and systems disclosed herein, the music audio for the synthetic song may also be synthesized using a music synthesis model that is an AI/ML model.

In the methods and systems disclosed herein, the user can then stream the synthetic song for audio playback or can store the synthetic song as a new digital song. The methods and systems disclosed herein may further include embodiments incorporating digital rights registration, such as using a blockchain rights management system, as well as embodiments that provide a user interface for controlling various parameters and aspects of operation of the vocal synthesis model. Various other aspects and features are included in the methods and systems for personalized cover-voice music synthesis disclosed herein.

Referring now to the drawings, FIG. 1 depicts an AI/ML architecture 100 as a schematic block diagram. AI/ML architecture 100 represents data and functional elements that can be computer-implemented, as described herein. As shown, AI/ML architecture 100 includes a training system 110 that can train and export an inference model 120 that is usable for various operations, including transformer operation. Output data 130 can represent content generated by inference model 120 resulting from transformer operation on input data 106.

Figure 3:
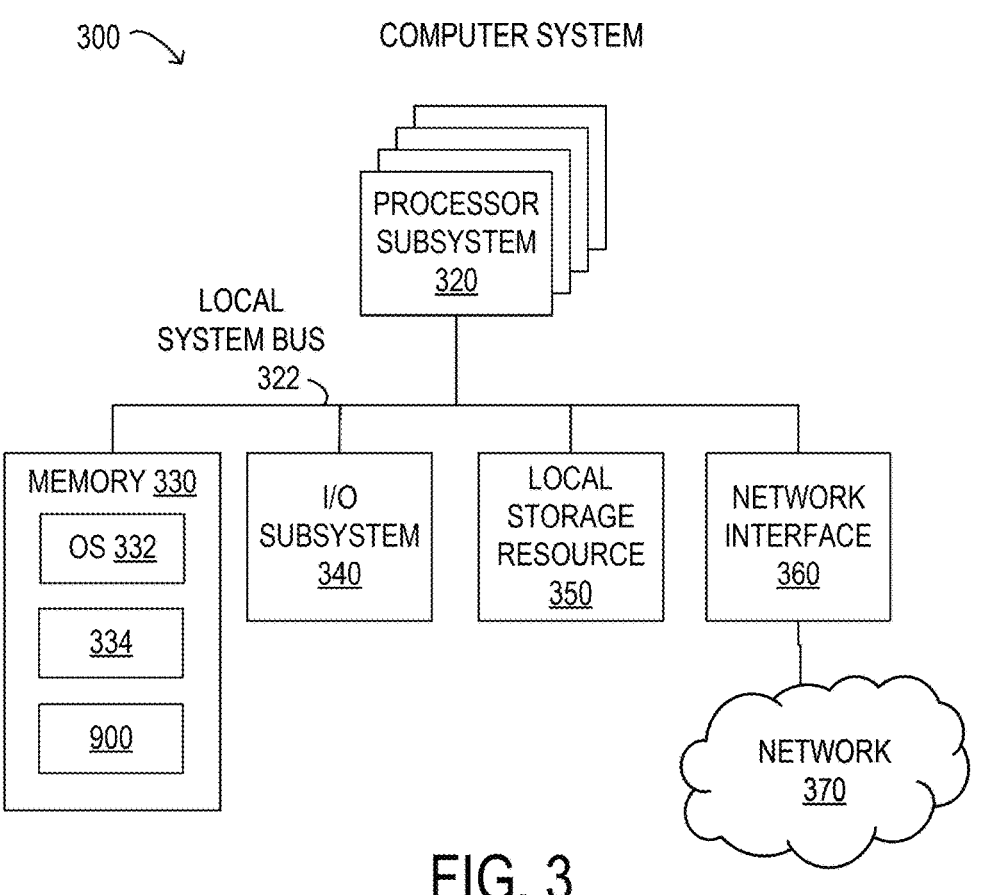
FIG. 3 is a depiction of a computer system for performing at least certain portions of cover music synthesis, as disclosed herein, in one embodiment.
Figure 4:
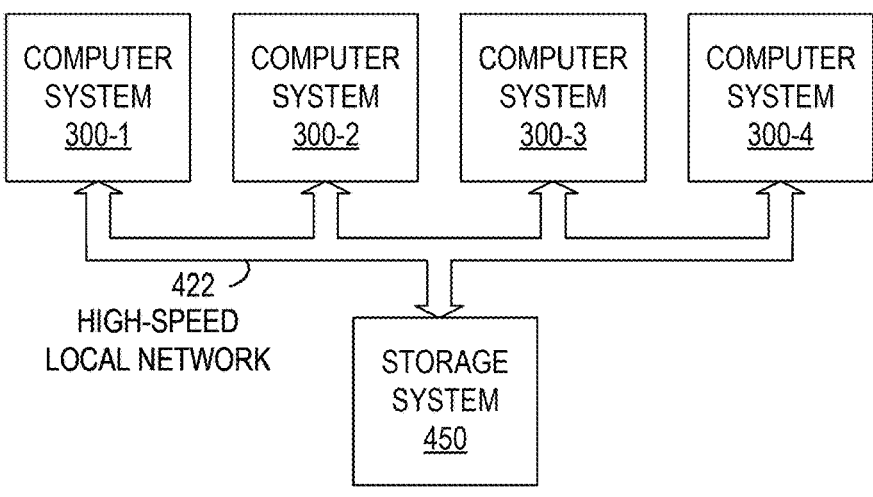
FIG. 4 is a depiction of a high performance computing (HPC) server for performing at least certain portions of cover music synthesis, as disclosed herein, in one embodiment.

In FIG. 1, training system 110 can receive training data 102 in order to train inference model 120 for a particular implementation, such as for a particular application executing on a given target computer platform (see also FIGS. 3 and 4). In some implementations, training data 102 may be collected in various forms. In various cases, training system 110 can use training data 102 to train inference model 120 until a certain condition is met, such as a quality parameter for output data 130 of inference model 120 being within a certain range. In addition to training data 102, training system 110 can access validation data 104 that can represent reference data that is known or expected to produce a desired result for comparison with training data 102. In this manner, the performance variability of inference model 120 being trained with training data 102 can be validated, such as to within a quality range, using validation data 104.

It is further noted that inference model 120 can include programmable instructions in the form of executable code for a computer processor, such as to implement one or more NNs (see FIG. 2) along with associated functionality. For example, the associated functionality with inference model 120 can include a transformer for performing particular operations on input data 106, such as using various data stored with or generated for use with inference model 120, as will be described in further detail. In different embodiments, a transformer may be specialized to operate with an LLM for NLP, such as for text processing. Some transformers can be specialized for certain types of content, such as vision transformers (ViT) for image or video data. Various transformers can be multimodal and can support different types of content, such as text, image, audio, music, etc.

In FIG. 1, training system 110 may export inference model 120 after sufficient training has been performed, such as based on training data 102 and validation data 104, indicated by arrow 108. The training and export indicated by arrow 108 may be based on various methods or techniques, such as backpropagation or distillation or various combinations thereof.

As shown in FIG. 1, any of training data 102, input data 106, and output data 130 can be stored in various types of memory, including volatile and non-volatile memory that is associated with and accessible by a computer system (see also FIGS. 3 and 4).

FIG. 2 depicts an NN architecture 200 in one embodiment. NN architecture 200 is depicted as a neural network architecture having an input layer 210, internal layers 212, 214, and an output layer 216. NN architecture 200 is a general embodiment that can represent an instance of, or at least certain portions of, inference model 120 to receive input data 106 and generate output data 130 as described above with respect to FIG. 1. NN architecture 200 can represent at least certain portions of training system 110, inference model 120, or both. Accordingly, input data 106 can be supplied to NN architecture 200 as input layer 210, while output data 130 can be obtained from output layer 216, as will be described in further detail below.

In the mathematical processing of NN architecture 200 of FIG. 2, the processing at each layer can be represented by an activation function that can be generalized by Equation 1.

$$y = \Sigma_i(w_i \cdot x_i) + b \qquad \text{Equation 1}$$

In Equation 1, y is an output value, i represents an index variable or dimension for each layer input, such as $\alpha$, b, x, and z in FIG. 2; $X_i$ represents the input value at each neuron, such as from another neuron; $W_i$ represents a weighting coefficient applied at each neuron; and b represents a constant for each neuron. The output of each neuron can be represented by output value y of Equation 1, among other parameters in particular embodiments.

The process of activation of each internal layer as described above and illustrated in FIG. 2 is generally known as feedforward activation, which characterizes the typical use of a neural network to receive input and generate output. Feedforward may occur over multiple timesteps and may involve the use of externally generated data, internally generated data, or both. The use of feedforward activation within NN architecture 200 to generate output (separate from feedback, backpropagation, and other training) is also known as "inference".

In particular, NN architecture 200 may use deep learning (DL) that can be used to determine higher level highly complex data abstractions with a hierarchical, layered NN architecture to enable learning. NN architecture 200 may learn by stating, describing, and implementing higher-level, more abstract features on top of lower-level, less abstract features. In this manner, NN architecture 200 can employ DL to analyze and learn from a large amount of unstructured data that can be unlabeled as well as uncategorized.

It is noted that although NN architecture 200 is depicted with a certain set of nodes or artificial neurons (referred to herein as simply "neurons") in FIG. 2, the dimensionality and structure of NN architecture 200 can be adapted for various specific types of data and applications. For example, as shown, NN architecture 200 can be expanded to a number of input neurons, w number of input layers each having b through x number of neurons respectively, and z number of output neurons. It is noted that a, b through x, w, and z can each have different dimensions, such as $10^3$, $10^6$, $10^9$, $10^{12}$, among other values in various embodiments. Furthermore, although a single network is shown with NN architecture 200 in FIG. 2, it is noted that in different implementations, NN architecture 200 can be structured to incorporate different numbers of networks, such as by implementing a branched or otherwise structured topology.

In order to implement NN architecture 200 for a given useful application, a training process can be employed to determine respective weighting coefficients applied at each neuron, such as using Equation 1 or another activation function. For example, weighting coefficients associated with neurons in NN architecture 200 can be represented as a 2-D tensor (e.g., a matrix) that are included in a "network state" of the NN.

In the field of NNs used as AI models, optimization algorithms can be useful for training models by minimizing the error between the predicted output and target values. One known class of optimization algorithms is gradient descent algorithms. Gradient descent can be an iterative optimization algorithm used to minimize a "cost function" (also referred to as a "loss function"), which quantifies an error or a difference between an AI model's prediction and a target value (e.g., a known reference value). The gradient descent can operate by adjusting the parameters of the NN to reduce the error over multiple iterations.

To identify a direction and a magnitude by which model parameters are to be updated, gradients represented by partial derivative of a given model parameter with respect to the cost function can be computed. The computation of the gradients is generally done using so called "backpropagation", which involves a reverse application of a chain rule to propagate the gradient of the loss function through the NN. In particular embodiments, backpropagation may be used to iteratively train NN architecture 200. For example, the calculated output of NN architecture 200 may be represented by output data 130 while the reference output may be represented by validation data 104 (see FIG. 1). The technique of backpropagation may use a gradient descent algorithm to locate minima in the cost function, representing the closest matches between the calculated output generated by NN architecture 200 and the reference output expected from NN architecture 200. The backpropagation method may begin with output layer 216 and then iterate in a reverse manner over internal layer 214, then internal layer 212, to finally arrive at input layer 210. The iterations may involve estimating or evaluating different values for the weighting coefficients $W_i$ applied at each neuron.

Because most useful NNs have large numbers of inputs and outputs, calculating the cost function for backpropagation can be resource-intensive. For some NNs, the runtime of each backpropagation may be greater than the feedforward activation, making it advantageous to limit the scope and frequency of snapshot states. In various implementations, evaluating the cost function in backpropagation may be performed on smaller portions of the cost function, such as to improve computational tractability and to enable parallelization of computing tasks that can increase efficiency or decrease overall computational resource consumption, which can be desirable.

FIG. 3 illustrates a block diagram depiction of a computer system 300, in accordance with one or more embodiments of this disclosure for cover music synthesis. Embodiments described herein may be implemented using a computer system, such as computer system 300, in an individual manner or in a cluster of multiple computer systems. Accordingly, computer system 300 may represent any of a variety of computing devices, such as, but not limited to personal computers, desktop computers, laptops, tablets, mobile devices, smart phones, cloud servers, blade computers, microcomputers, embedded devices, or modular computers, among others.

As shown in FIG. 3, computer system 300 includes a processor subsystem 320, a local system bus 322 for interconnecting various local elements, a memory 330, an operating system (OS) 332, an input/output (I/O) subsystem 340, a local storage resource 350, a network interface 360, and a network 370.

As shown in FIG. 3, processor subsystem 320 may include an integrated circuit (IC), such as in the form of a semiconductor device that is formed using at least one substrate, such as silicon. Processor subsystem 320 may accordingly be used for interpreting and executing program instructions and processing data that is stored either locally or remotely or both. Processor subsystem 320 may include a central processing unit (CPU) that uses an instruction set architecture to execute instructions, such as, but not limited to an advanced reduced instruction set computer (RISC) machine (ARM) architecture or an x86 instruction set architecture. A CPU included with processor subsystem 320 may include one core, multiple cores, or multiple types of cores. The cores in the CPU can include optimized cores, such as performance cores, power-efficient cores, hybrid cores, or specialized cores that can be optimized for a particular function or performance attribute (e.g., low power consumption, a given data width/precision, level of complexity, etc.) Processor subsystem 320 may include multiple ICs in a 3D configuration, including ICs on different substrates that may be combined using various 3D hybrid integration techniques in semiconductor processing. Processor subsystem 320 may include a CPU for executing program instructions to optimize the use of multiple cores using parameters such as but not limited to performance, energy, load balancing, throughput, wait time, or response time.

In particular embodiments, processor subsystem 320 may represent or include a single processor or multiple different kinds of processors, such as but not limited to a CPU, a graphics processing unit (GPU), a neural processing unit (NPU), a tensor processing unit (TPU), a hardware accelerator, a field programmable gate array (FPGA), an application specific integrated circuit (ASIC), or general logic circuitry. For example, processor subsystem 320 may include a system-on-chip (SoC) implementation that combines different kinds of processors onto a unitary substrate or package that can be customized for a given application or use case. In particular embodiments, the SoC included with processor subsystem 320 can accordingly include different CPU cores, CPU cache memory, a GPU, display engines, I/O interfaces (similar to I/O subsystem 340 described below), or an NPU, among other elements.

In some implementations, a general purpose CPU can be used for various acceleration, for example when flexibility in the kinds of calculations is desired, or when logical operations with large numerical values are involved. A GPU can also be used for acceleration to process high data volumes using relatively simple compute units that can be configured to execute in parallel. In certain embodiments, a video decoder/encoder can be implemented in hardware, such as integrated in a SoC, for acceleration of video processing. In certain embodiments, a SoC can include an image signal processor (ISP) that can provide advanced camera support, such as when computer system 300 includes an integrated camera device.

In particular embodiments, processor subsystem 320 may support so-called "on-board AI" in which an AI/ML model can be executed in the hardware included with processor subsystem 320 for acceleration of certain computational operations, such as linear algebra or matrix calculations. In particular, NPUs that operate similarly to GPUs may be used for on-board AI to achieve greater acceleration for execution of AI/ML models, and can achieve acceleration factors of 1,000× or 10,000× or greater with respect to other types of processors. For examples, an NPU can be integrated with other elements in the SoC, as noted above. NPUs can be specifically implemented to execute mathematical operations related to NN processing, such as linear algebra and tensor operations (including vector and matrix operations). In this manner, NPUs can support large or very large AI/ML models that are NNs having 109 or more neurons with multiple NN layers for complex logic. NPUs can be used, thus, for efficient execution of trained AI/ML models for on-board AI applications.

The linear algebra calculations performed by NPUs can include multiply-accumulate calculations, calculation of bias weights, or calculations of activation functions that may involve relatively simple and repetitive calculations performed at large scale, such as for on-board AI. As noted, in particular implementations, the linear algebra calculations performed by NPUs may be structured as matrix operations and can be executed using simplified compute units configured for parallel execution to improve acceleration. In particular NPU implementations, a large amount of memory can be included with or be accessible to the NPU, such as to support larger on-board AI applications. The memory used by the NPU can include random access memory (RAM) and cache memory that provides transient storage with high access speeds. Furthermore, to enhance acceleration, the NPU may be implemented to support lower precision numerical values, such as involving a smaller number of bits per numerical value, for NN calculations. In particular embodiments, the NPU can support integer values rather than floating point values for improved acceleration. As noted, the NPU may operate in a similar manner as a GPU. While the GPU may provide greater performance for executing AI/ML models, NPUs may be particularly suited for low-power consumption, such as in wireless devices or in smaller devices. NPUs may accordingly be well suited for use cases in which the AI/ML model executes continuously, such as for background tasks that the NPU can process independently without the CPU or the GPU, for example.

As shown in FIG. 3, a local system bus 322 may represent a variety of suitable types of bus structures, such as but not limited to a memory bus, a data bus, an address bus, a control bus, or a peripheral bus, among various other examples.

As shown in FIG. 3, memory 330 may include a system, device, or apparatus operable to retain and retrieve processor-executable instructions or data or both, such as for a period of time. Memory 330 may include volatile memory such as RAM, including video RAM (VRAM), static RAM (SRAM), or dynamic RAM (DRAM), cache memory, or non-volatile memory. Memory 330 may include or represent a computer-readable non-transitory medium that includes, but is not limited to portable or non-portable storage devices, optical storage devices, magnetic storage devices, or various other storage media. The processor-executable instructions may include a procedure, a function, a subprogram, a program, a routine, a subroutine, a module, a software package, a data object, a data structure, or a program statement, or various combinations thereof.

As shown in FIG. 3, an OS 332 is stored in memory 330. OS 332 may represent an execution environment for various program code executing on computer system 300. OS 332 may be any of a variety of standard or customized operating systems, such as but not limited to a Microsoft Windows® operating systems, a UNIX or a UNIX-based operating system, a mobile device operating system, an Apple® MacOS or iOS operating system, an embedded operating system, or a hypervisor for executing multiple virtual machines on common hardware, among others. OS 332 can be an operating system that supports shared memory, distributed memory, virtual memory, contiguous or non-contiguous memory allocation, among other memory arrangements. Also shown included with memory 1030 is a user application 334 for cover music synthesis that represents at least certain portions of cover music synthesis 500 (see FIGS. 5, 6, 7, 8, 9A, 9B, 9C, and 10), along with a user interface 900 (see FIGS. 9A, 9B, and 9C) that can be a part of user application 334, and can include instructions executable by processor subsystem 1020 for implementation of the methods and system described herein for cover music synthesis. Although use application 334 for cover music synthesis is depicted in FIG. 3 as executable instructions (e.g., software code), functionality of user application 334 for cover music synthesis can be implemented in various embodiments, such as in hardware or a combination of hardware and software. For example, in some embodiments, at least certain portions of use application 334 for cover music synthesis can be implemented using a CPU, a GPU, an NPU, a TPU, a hardware accelerator, an FPGA, an ASIC, or using general logic circuitry, among other types of hardware or ICs, or various combinations thereof. In various embodiments, computer system 300 can be a local system or a cloud server that can execute at least certain portions of user application 334 or user interface 900 (see FIGS. 3, 9A, 9B, 9C), and in particular, at least certain portions of AI/ML model functionality associated therewith.

As shown in FIG. 3, in computer system 300, I/O subsystem 340 may include a system, device, or apparatus generally operable to receive/transmit data to or from or internally within computer system 300. In different embodiments, I/O subsystem 340 may be used to support various peripheral devices, such as but not limited to a touch panel, a display adapter, a keyboard, a touch pad, and a camera. I/O subsystem 340 may represent a variety of communication interfaces such as, but not limited to, graphics interfaces, video interfaces, user input interfaces, and peripheral interfaces. I/O subsystem 340 may support various output or display devices, such as but not limited to a screen, a monitor, a general display device, a liquid crystal display (LCD), a plasma display, a touchscreen, a projector, a printer, and an external storage device. In some instances, I/O subsystem 340 can support multimodal systems that allow a user to provide multiple types of I/O to communicate with computer system 300.

As shown in FIG. 3, local storage resource 350 may comprise non-volatile or persistent computer-readable media such as a hard disk drive, CD-ROM, and other type of rotating storage media, flash memory, electrically erasable programmable read-only memory (EEPROM), or another type of storage media, and may be generally operable to store instructions and data and to permit access to stored instructions and data on demand. Local storage resource 350 may include a storage appliance or a storage subsystem having one or more arrays of storage devices such as for supporting redundancy, mirroring, or real-time data error correction and restoration.

As shown in FIG. 3, network interface 360 may facilitate connecting computer system 300 to network 370. Network 370 may represent various configurations, such as but not limited to a local area network (LAN), a wide area network (WAN) such as the Internet, or a mobile network, such as a wireless network. Network interface 360 may accordingly include or support wireless networks or wired networks. The wired network media supported by network interface 360 (or included in I/O subsystem 340) may include analog media, universal serial bus (USB), Apple® Lightning®, Ethernet, peripheral connect interface express (PCIe), DisplayPort (DP), Thunderbolt, fiber optics, a proprietary wired media, or an ad-hoc network media, among others. The wireless network media supported by network interface 360 may include or support visible light communication (VLC), worldwide interoperability for microwave access (WiMAX), a Bluetooth® wireless signal transfer, an IBEA-CON® wireless signal transfer, an radio-frequency identification (RFID) wireless signal transfer, near-field communications (NFC) wireless signal transfer, dedicated short range communication (DSRC) wireless signal transfer, 802.11 WiFi wireless signal transfer, wireless local area network (WLAN) signal transfer, infrared (IR) communication wireless signal transfer, global navigation satellite system (GNSS), global system for mobile communication (GSM), such as 3G/4G/5G/LTE cellular data network wireless signal transfer, radio wave signal transfer, microwave signal transfer, infrared signal transfer, visible light signal transfer, ultraviolet light signal transfer, or more generally, various kinds of wireless signal transfer along using radiation in a wavelength range of the electromagnetic spectrum.

FIG. 4 illustrates a block diagram depiction of a high-performance computing (HPC) server 400 in accordance with one or more embodiments of this disclosure for cover music synthesis. Embodiments described herein may be implemented using an HPC server, such as HPC server 400 shown including multiple computer systems 300-1, 300-2, 300-3, 300-4. Although four computer systems 300-1, 300-2, 300-3, 300-4 are shown in FIG. 4 for descriptive purposes, it is noted that any number of computer systems 300 may be used. In particular embodiments, a large number of computer systems 300 may be aggregated in HPC server 400 to provide greater computing capacity. Accordingly, workloads may be executed in a distributed manner in HPC server 400, by implementing multi-node application execution, such that multiple computer systems 300-1, 300-2, 300-3, 300-4 share processing of work tasks that may be performed in a parallel or simultaneous manner.

As shown in FIG. 4, HPC server 400 can be described in general terms as a collection of computer systems 300-1, 300-2, 300-3, 300-4 or any number of computer systems that respectively include a local processor and local memory and are interconnected by high-speed local network 422, which may be a dedicated high-bandwidth, low-latency network. HPC server 400 can accordingly aggregate and combine the computational power of multiple computer systems 300-1, 300-2, 300-3, 300-4, or any number of computer systems, to perform large-scale work tasks. HPC server 400 can flexibly scale HPC resources that can be matched to desired work tasks. HPC server 400 can also provide cluster configuration for work task parallelization, data distribution, parallel execution, cluster monitoring and control, as well as supporting parallelized computations having combined output. Various software applications can execute on HPC server 400 in a local or distributed manner, such as on a single HPC computer system 300-1 or on multiple HPC computer systems with the addition of computer systems 300-2, 300-3, 300-4, or another number of computer systems.

As shown in FIG. 4, HPC server 400 is shown including a storage node 450, which may represent one or more storage devices that are compatible with high-speed local network 422. High-speed local network 422 may be a dedicated local bus such as including InfiniBand, 40 Gb Ethernet, or PCIe. Accordingly, storage node 450 can provide access to storage resources using low latency high-speed local network 422 to support HPC work tasks handled by HPC server 400. It is further noted that HPC server 400 may include a dedicated network interface that can provide network connectivity by using computer systems 300-1, 300-2, 300-3, 300-4, or another number of computer systems. In various embodiments, HPC server 400 can be a cloud server that can execute at least certain portions of user application 334 or user interface 900 (see FIGS. 3, 9A, 9B, 9C), and in particular, at least certain portions of AI/ML model functionality associated therewith.

Figure 5:
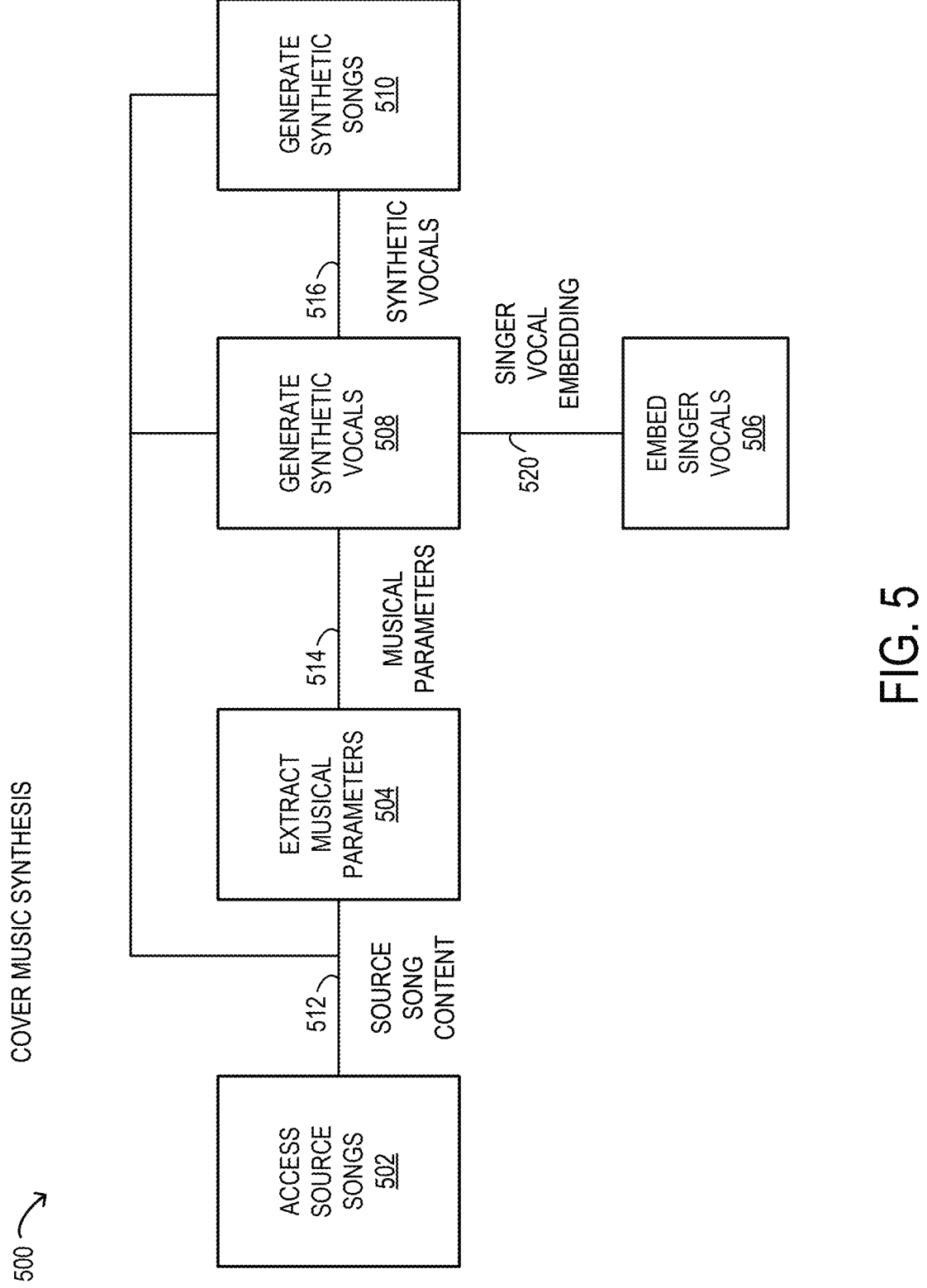
FIG. 5 is a depiction of cover music synthesis, in one embodiment.

Turning now to FIG. 5, is a depiction of a cover music synthesis 500, in one embodiment. FIG. 5 is a schematic illustration of operations in a modular flow chart format showing certain data flow elements for descriptive clarity. It will be understood that cover music synthesis 500 can include various other elements or sub-elements in different embodiments, and as described in further detail below. A shown in FIG. 5, cover music synthesis 500 describes a process or a system for personalized music cover generation, also referred to as cover music synthesis herein, and also often referred to as a "pipeline" with respect to AI/ML model applications that involve data flow and parallelization to generate desired output. In cover music synthesis 500 a digital audio source of music titles, also referred to as a source of songs is accessed and source song content, including a music content and a vocal content, can be extracted. The source of songs can be a playlist, such as from a music service, that provides multiple source songs. Then, for each source song, musical parameters for the song content may be extracted. A vectorized embedding (or simply "embedding") of a singer's vocals can be generated or obtained. Then, using the source song content, the musical parameters, the singer vocal embedding, among other inputs, synthetic vocals matching the source song, such as in style and genre, can be synthesized, for example, using one or more AI/ML models comprising NNs, as described above. The synthetic vocals can then be combined with the music content from the source song to generate a synthetic song in the form of a synthetic sound audio that is in audio waveform format for playback and listening. The music content in the synthetic song may be obtained from the music portion of the source song, or may also by synthetically generated in some embodiments. As noted, in particular embodiments, at least certain portions of cover music synthesis 500 can be implemented using software, such as represented by user application 334 for cover music synthesis (see FIG. 3) and mobile application 1134 for cover music synthesis (see FIG. 11).

As shown in FIG. 3, cover music synthesis 500 includes operations to access source songs 502 that result in source song content 512. Cover music synthesis 500 then includes operations to extract musical parameters 504 that receive source song content 512, among other inputs, and output musical parameters 514, among other outputs. Cover music synthesis 500 then includes operations to generate synthetic vocals 508 that receive musical parameters 514, source song content 512, and a singer vocal embedding 520, among other inputs, to generate synthetic vocals 516, among other outputs. Singer vocal embedding 520, as shown in FIG. 5, is generated by operations to embed singer vocals 506, which can provide a vectorized embedding that is characteristic of various properties of the vocals of a given singer. Then, cover music synthesis 500 includes operations to generate synthetic songs 510 that can receive synthetic vocals 516, musical parameters 514, and source song content 512, among other inputs, to generate a synthetic song audio 708 (see FIG. 7), among other outputs. Further details of the various operations and elements in cover music synthesis 500 are describe below and in subsequent FIGS. 6, 7, and 8, for particular embodiments.

In cover music synthesis 500, operations in access source songs 502 can include various functionality to access digital music audio data or files for use as at least one source song, such as from sources including a media library, an online playlist, or a music service. For example, the source of the source song can be a local or a remote storage location. In various embodiments, the music service can be selected from at least one of: Spotify, Apple Music, Amazon Music, YouTube Music, Tidal, QQ Music, NetEase Cloud Music, Gaana, JioSaavn, Deezer, Pandora, Idiago, Primephonic, SoundCloud, Bandcamp, Audiomack, Beatport, HDTracks, iHeartRadio, TuneIn, or SiriusXM. Accordingly, an application programming interface (API) for the music service may be used by operations to access source songs 502, while the music service may provide source songs from audio data or video data. In some embodiments, functionality or operations to access source songs 502 can include downloading source song content 512 to a local storage associated with cover music synthesis 500. In other embodiments, operations to access source songs 502 can include operations to retrieve source song content 512 in volatile memory without local storage, such as operations to extract musical parameters 504 and operations to obtain musical parameters 514. In particular embodiments, encryption may be used by operations to access source songs 502, such as to keep the source songs secure from unwanted or malicious access. In different embodiments, operations to access source songs 502 may retrieve or access waveform audio data or files, or symbolic music information, such as in a musical instrument digital interface (MIDI) format.

As noted, in various embodiments, operations to access source songs 502 can access one or more source songs for cover music synthesis 500, represented by source song content 512. In the following description, therefore, reference to a source song in singular can include or imply operations performed on multiple source songs in the same or similar manner.

Then in cover music synthesis 500, operations to extract musical parameters 504 may result or output musical parameters 514 corresponding to source song content 512. Musical parameters 514 can be indicative of source song content 512 and can describe at least one of: a lyric phoneme sequence, harmony, melody, musical structure, musical form, temporal dynamics, timbre, color, or orchestration of source song content 512 that can include source song music content 512-1 and source song vocal content 512-2. In particular embodiments, musical parameters 514 describe source song music content 512-1 that may be separated from source song vocal content 512-2 by operations to extract musical parameters 504.

In operations to extract musical parameters 504, source song musical content 512-1 can describe a melody of the source song, also referred to as a melody contour, that is a fundamental frequency (fo) corresponding to a pitch of a predominant melodic line of the source song that comprises polyphonic music. Accordingly, operations to extract musical parameters 504 can use a deep learning approach for extracting the melody contour described by source song musical content 512-1, such as a convoluted neural network (CNN)-based method, a joint source separation method, or using an end-to-end network. The CNN method can include using a convolutional representation for pitch estimation (CREPE, Google) architecture that is an AI/ML model system having attention mechanisms for melody extraction, or using DeepSalience to generate a salience map of frequency probabilities for fo. The joint source separation method can include tools such as Spleeter (spleeter.online, Deezer), Demucs, or self-supervised pitch estimation (SPICE, Google Research). Spleeter is an audio separation tool developed by Deezer that is designed to split mixed audio tracks into individual components, such as vocals, drums, bass, and other instruments using CNNs for deep learning. Spleeter analyzes audio waveforms and isolates distinct sound sources with high accuracy. Demucs is a music source separation model designed to isolate different elements of a song, such as vocals, drums, and bass. It utilizes advanced machine learning techniques, specifically a U-Net convolutional architecture, to achieve high-quality separation SPICE is an AI/ML model a model to estimate the fundamental frequency in monophonic audio, often referred to as pitch estimation. CREPE is an AI/ML model that learns pitch detection without labeled data, and is trained on pitch-shifted audio pairs. The end-to-end networks can include MELODIA-DL that is a deep learning AI/ML model, frequency-temporal attention network (FTANet), or a direct spectrogram for melody contour mapping. In particular embodiments, a deep learning AI/ML model is used in combination with knowledge of harmonic structure and continuity constraints generally associated with musical content by extract musical parameters 504 for maximized or optimized accuracy.

In cover music synthesis 500 as shown in FIG. 5, singer vocal embedding 520 can be output by operations to embed singer vocals 506 that represent various sources and methods for generating vectorized embeddings of a given voice or vocal signature of a singer. In particular embodiments, embed singer vocals 506 can employ one or more encoders that can encode various aspects of the singer's singing voice, such as at least one of a speaker/singer identity encoder, a content encoder, or a singing style encoder. Furthermore, such encoders that can include various types of AI/ML models, can be subject to fine-tuning by using adaptation data for a particular singer. The adaptation data can include an audio recording of the singer's voice, either speaking or singing, for a period of time, such as between about 1 and 5 minutes, in particular embodiments. In various implementations of operations to embed singer vocals 506, certain criteria may be particularly relevant, such as at least one of preserving vibrato for different timbre, maintaining musical and phoneme timing, handling extended vowels and melismas, preserving emotional expression, or accommodating harmony and polyphony. In particular embodiments, embed singer vocals 506 can employ pre-trained self-supervised AI/ML models for content encoding, specialized speaker encoders trained on singing data, explicit $f_0$ modeling for pitch accuracy as described above, or adversarial training for disentanglement. Some examples of content encoders include HuBERT, Wav2Vec, phoneme posteriorgrams (PPG), and VQ-VAE, a variational auto encoder. Some examples of specialized speaker encoders for identity include generalized end-to-end loss (GE2E), emphasized channel attention, propagation and aggregation in a time delay neural network (ECAPA-TDNN), ResNet-SE, or X-Vectors. Some examples of singing voice conversions include SingGAN that is a generative adversarial network (GAN), DiffSinger/DiffSVC, So-VITS-SVC, or retrieval-based voice conversion (RVC).

As shown in cover music synthesis 500 in FIG. 5, operations to generate synthetic vocals 508 can employ generative AI/MML models to output synthetic vocals 516. Operations to generate synthetic vocals 508 may output synthetic vocals 516 based on conditions given by various inputs, such as vectorized embeddings or parameter values, for inputs including musical parameters 514, source song content 512, and singer vocal embedding 520, among other inputs. Further details of operations to generate synthetic vocals 508 are given in FIGS. 6 and 8, as described in further detail below.

Also shown in cover music synthesis 500 in FIG. 5, operations to generate synthetic songs 510 may include operations to create synthetic song audio 708 (see FIG. 7) in one embodiment, or may output multiple songs corresponding to multiple source songs identified by operations to access source songs 502. In particular embodiments, inputs including synthetic vocals 516, and source song content 512 can be used by operations to generate synthetic songs 510, for example for mixing audio waveforms (see FIG. 7).

Figure 6:
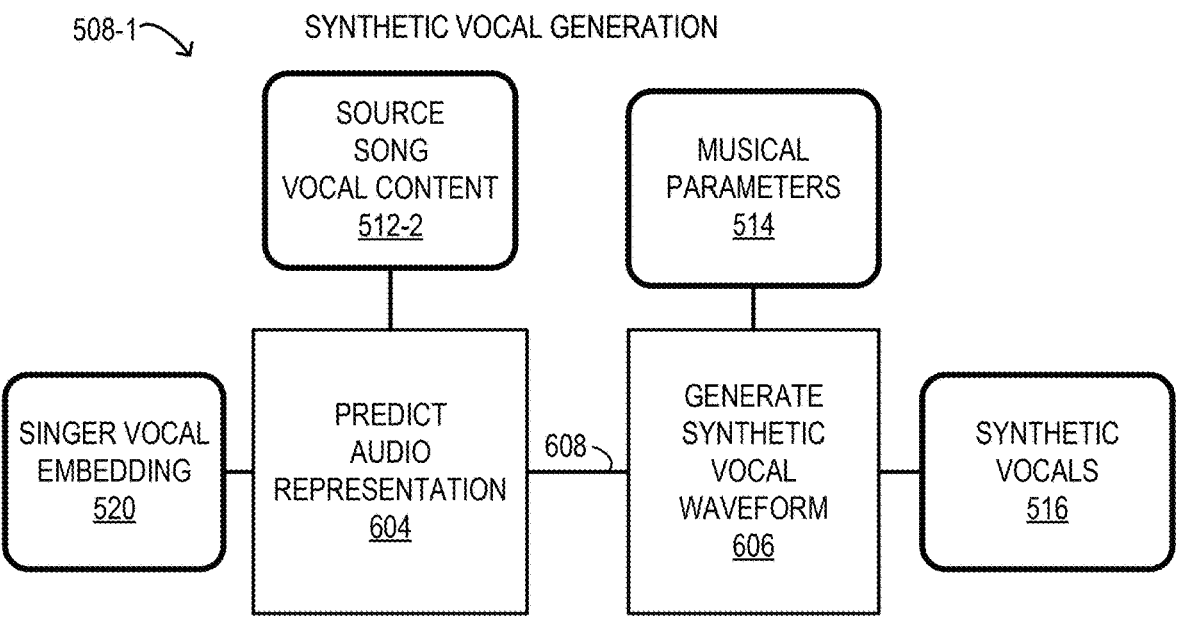
FIG. 6 is a depiction of synthetic vocal generation, in one embodiment.

FIG. 6 is a depiction of operations to generate synthetic vocals 508-1, in one embodiment. As shown, operations to generate synthetic vocals 508-1 may include operations to predict audio representation 604 and generate synthetic vocals waveform 606. As described in further detail below, operations to predict audio representation 604 can be implemented with various types of AI/ML models that can make inference predictions based on training to learn aspects and properties of sets of validation data. For example, AI/ML models used for operations to predict audio representation 604 may be trained on a corpus of many singers to learn generalized singing synthesis. As with operations to embed singer vocals 506, operations to predict audio representation 604 may include various types of AI/ML models that can be subject to fine-tuning by using adaptation data for a particular singer. The adaptation data used for fine-tuning can include an audio recording of the singer's voice, either speaking or singing, for a period of time, such as between about 1 and 5 minutes, in various embodiments. As noted in further detail, various different AI/ML models used for operations to predict audio representation 604 may include functionality to assess and optimize robustness, such as pitch-shifting or time-stretching, in particular embodiments.

Figure 8:
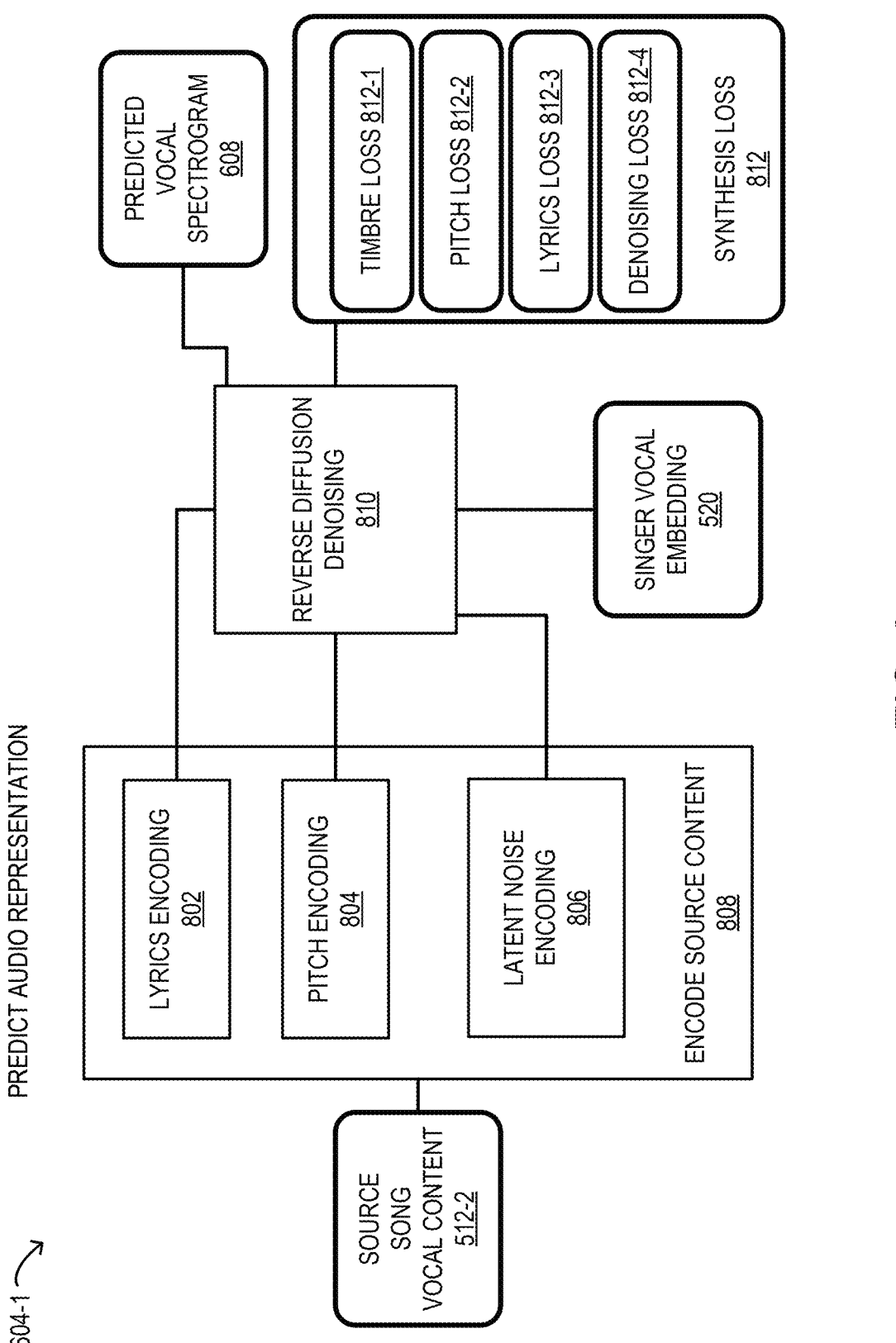
FIG. 8 is a depiction of audio representation prediction, in one embodiment.

In synthetic vocal generation 508-1 in FIG. 6, operations to predict audio representation 604 can receive singer vocal embedding 520 and source song vocal content 512-2 to generate a predicted vocal spectrogram 608 (see also FIG. 8). In various implementations, operations to predict audio representation 604 can employ generative adversarial networks (GAN) for vocal synthesis by adversarial training between a generator model that creates vocals and a discriminator model that is adversarial to the generator model, while judging the vocals created for being genuine or artificial. In some embodiments, GANs for vocal synthesis can produce sharp, clear output while preserving fine detail while operating in real time. GANs for vocal synthesis may suffer from training instability and difficulty in modulating output control, while being sensitive to non-vocal content in training vocals.

An example implementation of operations to predict audio representation 604-1 that uses a diffusion-based denoiser is depicted in further detail in FIG. 8. In various implementations of operations to predict audio representation 604, different types of approaches may be combined, such as using a transformer/recursive NN (RNN) for linguistic modeling, a diffusion/flow technique for acoustic modeling, and a GAN vocoder for waveform synthesis.

As shown in FIG. 6, operations to predict audio representation 604 can output a predicted vocal spectrogram 608 that can be a mel-spectrogram. Then, predicted vocal spectrogram 608 can be used by operations to generate synthetic vocal waveform 606 that can also receive musical parameters 514 and output synthetic vocals 516, such as in audio waveform format. In particular embodiments, operations to generate synthetic vocal waveform 606 can use a neural vocoder that includes a deep learning AI/ML model to convert predicted vocal spectrogram 608 into synthetic vocals 516 in waveform format. Various approaches and implementations can be used for operations to generate synthetic vocal waveform 606, such as autoregressive AI/ML models, flow-based AI/ML models, a GAN-based vocoder, a diffusion based vocoder. An example of an autoregressive AI/ML model is WaveNet that generates audio sample-by-sample. An example of a flow-based AI/ML model is WaveGlow that uses normalizing flows to learn invertible mappings. Examples of GAN-based vocoders include HiFi-GAN and MelGAN that use the adversarial training approach. An example of a diffusion-based vocoder is Diffa that applies diffusion AI/ML models to waveform generation (see also FIG. 8).

Figure 7:
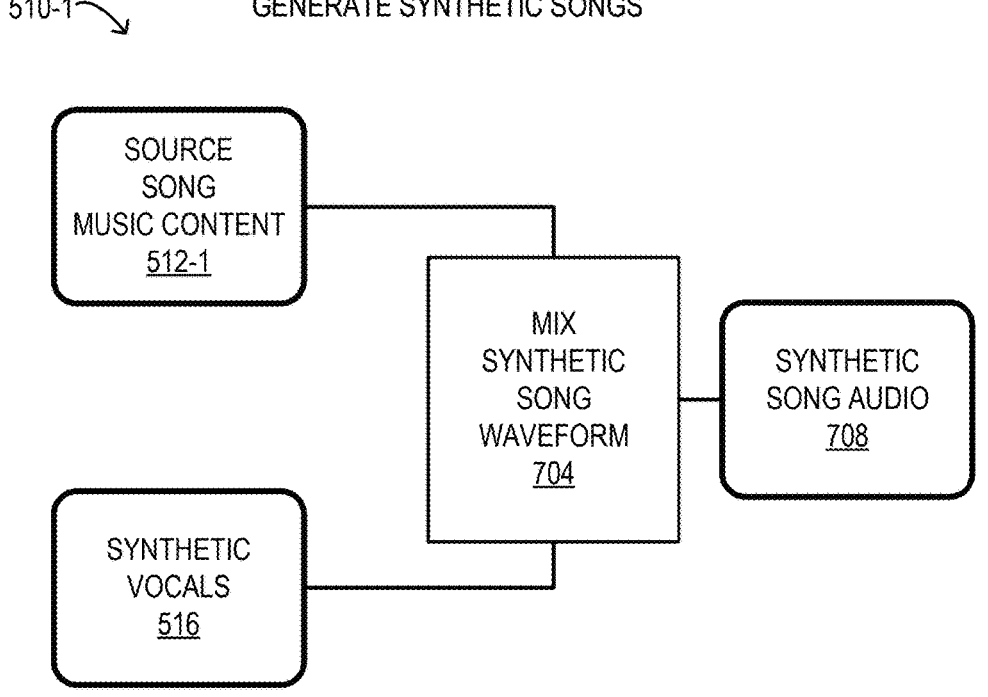
FIG. 7 is a depiction of synthetic song generation, in one embodiment.

FIG. 7 is a depiction of operations to generate synthetic songs 510-1, in one embodiment. As shown, operations to generate synthetic songs 510-1 may include operations to mix synthetic song waveform 704. For example, when synthetic vocals 516 and source song content 512-1 are in waveform format, operations to mix synthetic song waveform 704 can mix the waveforms in the audio domain to output synthetic song audio 708 in waveform format. In some embodiments, when synthetic vocals 516 and source song content 512-1 are in a symbolic format, such as a MIDI format, operations to mix synthetic song waveform 704 can mix the symbolic portions or stems to output synthetic song audio 708 in the symbolic format. Additionally, operations to mix synthetic song waveform 704 may be configured for fine-tuning of the prosody of synthetic audio song 708, such as by using user application 334 (see FIG. 3) or mobile application 1134 (see FIG. 11) in various embodiments. Such fine-tuning of the prosody of synthetic audio song 708 can include adjusting how well the natural rhythm and stress patterns of the lyrics match the musical rhythm and melodic contour, in order to optimally blend the lyrics and music. Certain elements of prosody of synthetic audio song 708 that may be fine-tuned include at least one of syllabic stress, melodic contour, rhythmic alignment, or phrase structure.

Furthermore, since synthetic song audio 708 can represent a new song, operations to generate synthetic songs 510 can incorporate registration and digital rights management (DRM) for synthetic audio song 708. For example, operations to generate synthetic songs 510 can register synthetic song audio 708 with at least one blockchain rights management system that can create a permanent digital record that is traceable and trackable. Additionally, in some embodiments, source song music content 512-1 can be a synthetic version that is generated using an AI/ML model, such as disclosed herein. In this manner, properties of source song music content 512-1 may themselves be available for adjustment or tuning, including various aspects disclosed herein, such as to match features described or learned by singer vocal embedding 520 that is used to generate synthetic vocals 516.

FIG. 8 is a depiction of operations to operations to predict audio representation 604-1, in one embodiment. In particular, operations to predict audio representation 604-1 include operations to perform reverse diffusion denoising 810 to generate predicted vocal spectrogram 608 (see also FIG. 6). As shown in FIG. 8, operations to predict audio representation 604-1 include operations to encode source content 808 that receives source song vocal content 512-2. In some embodiments, when source song vocal content 512-2 includes embeddings, operations to encode source content 808 may identify or separate lyrics encoding 802 and pitch encoding 804 from source song vocal content 512-2.

In other embodiments of operations to predict audio representation 604-1, when source song vocal content 512-2 includes an audio representation of the source singers vocals, such that operations to encode source content 808 perform various encoding tasks in a processing pipeline for operations to perform reverse diffusion denoising 810. For example, a text processing pipeline to generate lyrics encoding 802 may include phoneme conversion, tokenization and embedding, as well as contextual encoding, such as using transformer encoding, convolutional layers, or positional encodings. An audio processing pipeline may use waveform audio or symbolic audio to represent pitch in pitch encoding 804 using various approaches, such as linear/log scaling to normalize a perceptual range, pitch embeddings for learned vectorized representations of discrete pitch types, and continuous encoders that use small multilayer perceptrons (MLP) that continuously process $f_0$ values. Latent noise encoding 806 may represent a noise source used by operations to perform reverse diffusion denoising 810 by incrementally adding and then removing noise from lyrics encoding 802 and pitch encoding 804, based on singer vocal embedding 520, to output predicted vocal spectrogram 608. In various embodiments, lyrics encoding 802 and pitch encoding 804 can be integrated into reverse diffusion denoising 810 architecturally using cross-attention mechanisms, feature-wise linear modulation (FILM), concatenation based conditioning by processing through CNNs or transformers, or combinations thereof. Furthermore, lyrics encoding 802 and pitch encoding 804 may also be subject to temporal alignment for frame-level alignment by methods such as learned alignment using attention mechanisms, forced alignment that is pre-computed a priori, and duration modeling that explicitly predicts phoneme lengths. In various embodiments, operations to encode source content 808 can using various techniques such as hierarchical encoding that is based on syllables, words, or phrases, joint encoding, or variational encoding that adds latent variables for genre and can sample from learned distributions during inference. Other aspects that operations to encode source content 808 may consider for following lyrics and melody of source song vocal content 512-2 while maintaining vocal quality and expression include multi-resolution processing for different features at different time scales, robustness, smooth transitions, and style/genre consistency.

In operations to predict audio representation 604-1, operations for reverse diffusion denoising 810 can use lyrics encoding 802 and pitch encoding 804 as conditional input signals, along with singer vocal embedding 520. A pipeline for the processing architecture of reverse diffusion denoising 810 can include a U-net backbone, cross-attention layers to manage different conditional constraints, time embeddings to discern noise levels at respective timesteps, vocoder integration for operating on a mel-spectrogram for predicted vocal spectrogram 608. Some examples of reverse diffusion denoising 810 include DiffSinger, SingDiffusion, and ProDiff. Also shown in FIG. 8 are synthesis losses 812 that are output by reverse diffusion denoising 810, for purposes of statistical evaluation and performance tracking, among other uses, and include timbre loss 812-1, pitch loss 812-2, lyrics loss 812-3, and denoising loss 812-4.

Figure 9A:
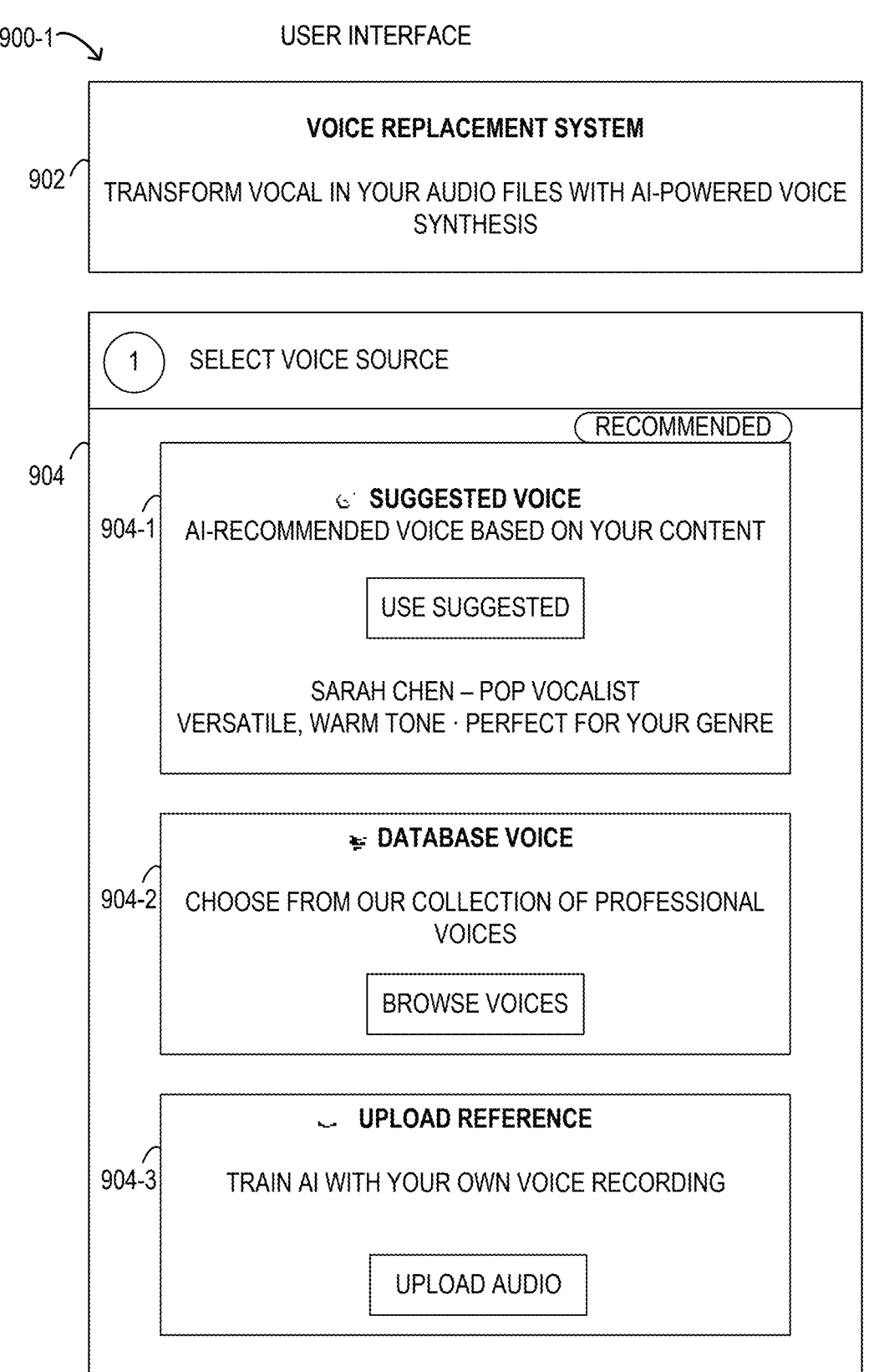
FIGS. 9A, 9B, and 9C are depictions of a user interface for cover music synthesis, in one embodiment.
Figure 9B:
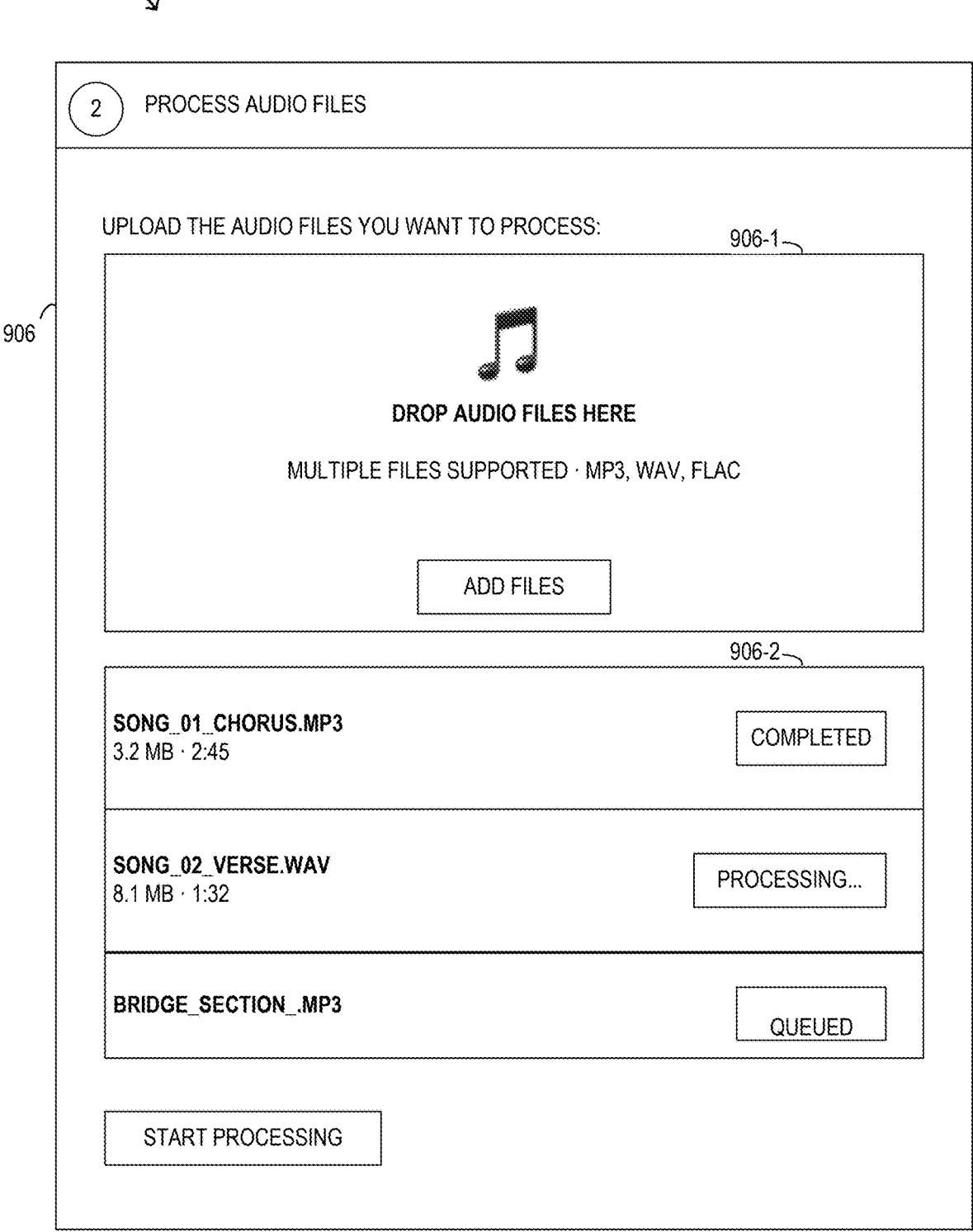
Figure 9C:
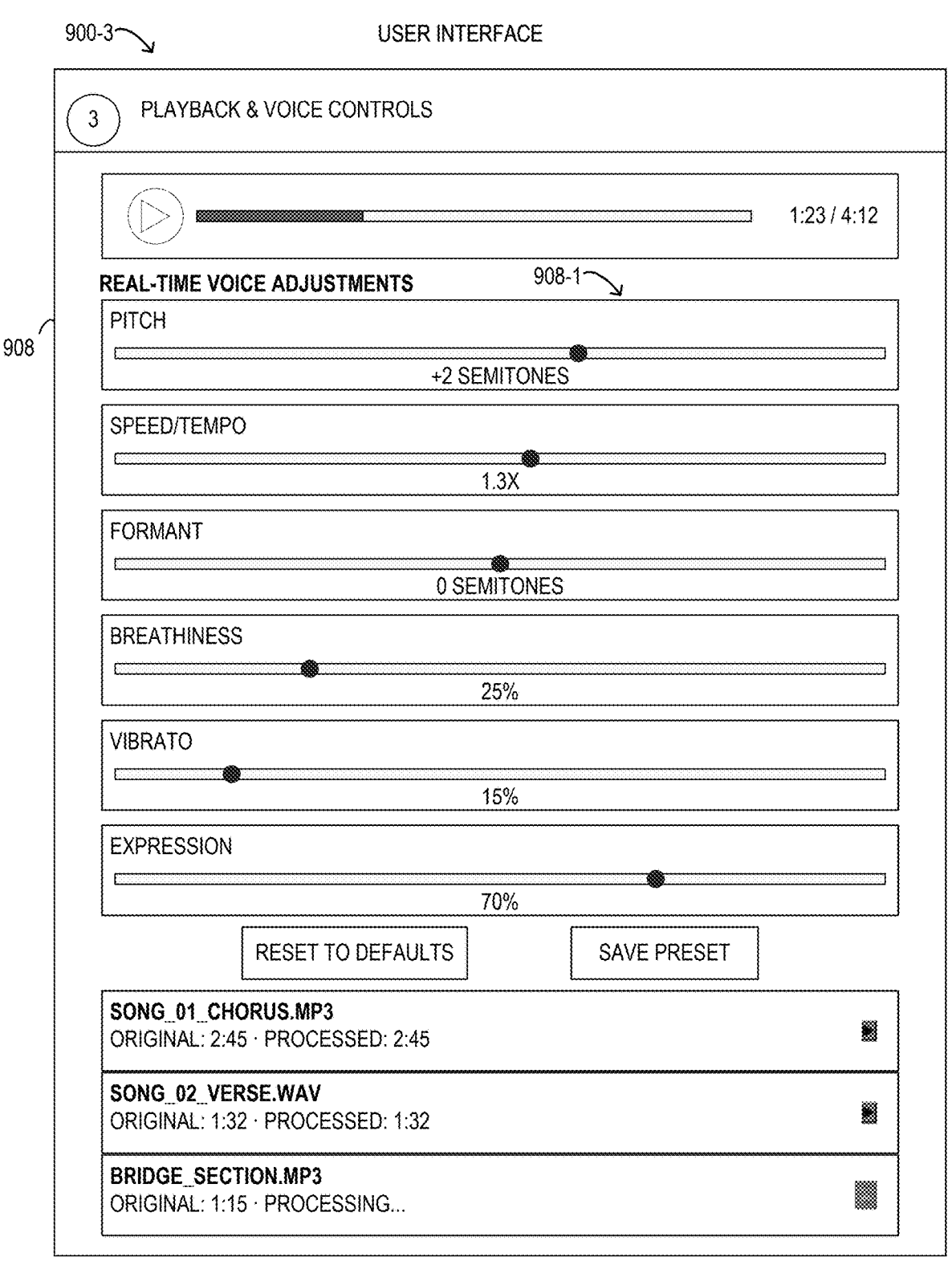

FIGS. 9A, 9B, and 9C are depictions of a user interface 900 for cover music synthesis, in one embodiment. In various embodiments, at least certain portions or certain functionality depicted and described below with respect to user interface 900 may be implemented in user application 334 for cover music synthesis (see FIG. 3) or in mobile application 1134 for cover music synthesis (see FIG. 11). Although certain elements and numbers of elements are shown and described with user interface 900 in FIGS. 9A, 9B, and 9C for illustrative and descriptive purposes, it is noted that in various embodiments different types, different numbers, and different arrangements of elements may be used.

In FIG. 9A, a user interface 900-1 depicts a banner 902 and a first window 904 of user interface 900. Banner 902 may provide information about functionality and operation of user interface 900. First window 904 may be for purposes of selecting a voice source. A first panel 904-1 in first window 904 may present a suggested voice source and a selection button therefor. The suggested voice source can represent a recommendation provided by using an AI/ML model, such as by operations to access source songs 502 (see FIG. 5) or other operations in cover music synthesis 500, for example. In some implementations, the recommendation can be the result of a clustering analysis on a corpus of songs by multiple singers, and can be very large corpus with a large number of singers. The AI/ML model generating the recommendation may apply a clustering algorithm, such as at least one of partitioning methods (k-means, k-medoids, k-modes), hierarchical methods (agglomerative (bottom-up), divisive methods (top-down)), density-based methods (density-based spatial clustering of applications with noise (DBSCAN), ordering points to identify the clustering structure (OPTICS), mean shift), distribution-based methods (Gaussian mixture models (GMM), expectation-maximization (EM)), graph-based methods (spectral clustering, affinity propagation), grid-based methods (statistical information grid (STING), clustering in quest (CLIQUE), fuzzy methods (fuzzy C-means), or modern/deep learning methods (self-organizing maps (SOM), deep embedded clustering (DEC), variational autoencoders (VAE) clustering). The recommendation by the AI/ML model can also be based on other aspects disclosed herein, such as genre or style.

A second panel 904-2 in first window 904 may enable access to a database or other repository of voice sources and a selection button therefor. A third panel 904-3 in first window 904 may enable uploading of a voice source and a selection button therefor.

In FIG. 9B, a user interface 900-2 depicts a second window 906 of user interface 900. Second window 906 may be for purposes of uploading a source song for cover-voice song synthesis. A first panel 906-1 in second window 906 may allow for insertion of an audio file containing the source song. Other options in first panel 906-1 or another user interface element may be included in other embodiments, such as selection of the source song from a music library or a music service. In particular embodiments, the source song is not uploaded but is accessed at a remote location using first panel 906-1 or another user interface element, such that the source song contents are not loaded into volatile memory but are processed in situ, for example, for security purposes. In various embodiments, first panel 906-2 can accept multiple source songs or a playlist of source songs for sequential processing, such as automated sequential processing. A second panel 906-2 in second window 906 may present a status of synthesis tasks performed or in progress, such as for prior source songs or for each source song in the playlist that have been processed, are currently being processed, or are queued for subsequent sequential processing.

In FIG. 9C, a user interface 900-3 depicts a third window 908 of user interface 900. Third window 908 may be for purposes of playback, such as playback of synthetic songs generated, according to the methods and systems described herein. Accordingly, third window 908 can include elements of a music player, such as a playbar with play duration display. Third window 908 also includes a plurality of parameter inputs 908-1 shown as voice adjustment sliders for certain parameters, such as pitch, speed/tempo, formant, breathiness, vibrato, expression, among others. It is noted that various parameter inputs 908-1 can be provided in different embodiments, along with other controls such as for scaling of parameter inputs 908-1. Other elements of a playback window are also shown, including playback history and various controls for parameter inputs 908-1 that can be used in different embodiments, such as for reordering, skipping, or looping songs or tracks in a playlist. For example, the parameter controls can vary aspects of the synthetic song during playback, and in particular, aspects of the synthetic vocals in the synthetic song being played.

Referring now to FIG. 10, depicts a flow chart of selected elements of an embodiment of a method 1000 for cover music synthesis, as disclosed herein. Method 1000 may be performed using computer system 300 or HPC server 400, among other computing platforms, in various embodiments. It is noted that certain operations described in method 1000 may be optional or may be rearranged in different embodiments.

Method 1000 may begin at step 1002 by accessing a first digital song specified in a playlist of one or more digital songs. At step 1004, from the first digital song, first musical parameters characteristic of a music content of the first digital song are extracted. At step 1006, a first vocal embedding indicative of a first singer is received, the first vocal embedding describing speech spoken by or vocals sung by the first singer. At step 1008, using the first vocal embedding, first synthetic vocals for the first digital song are generated using a vocal synthesis model, the first synthetic vocals matching the first musical parameters. At step 1010, the first synthetic vocals are combined with a first music audio corresponding to the first digital song to generate a first synthetic song.

Figure 11:
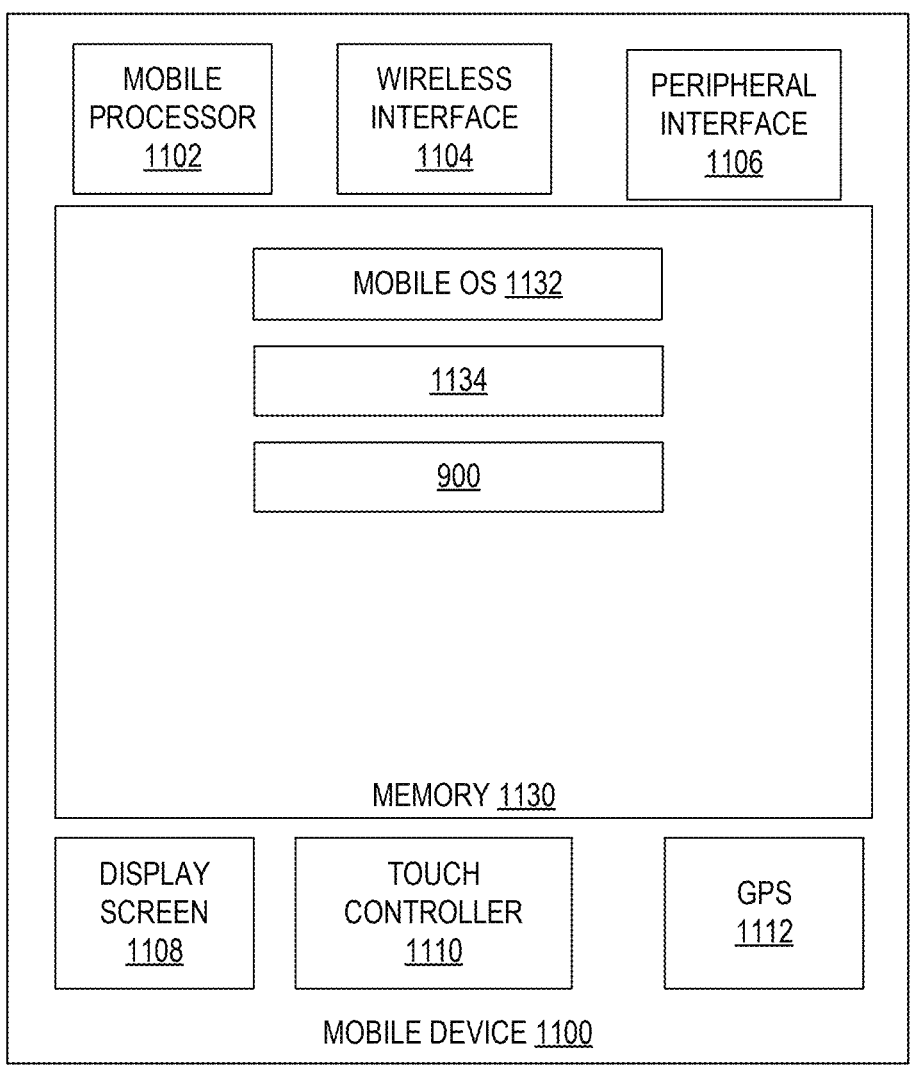
FIG. 11 is a depiction of a mobile device, in one embodiment.

Referring now to FIG. 11, a block diagram of a mobile device 1100 is depicted. Mobile device 1100 may represent any of a variety of mobile devices with communication and data processing capability. Mobile device 1100 may accordingly represent a mobile phone, a smart phone, a tablet, a portable computer, a laptop, a media player, among others. In various embodiments, mobile device 1100 is a smart phone that may include various functionality selected from: cellular telephony, wireless networking, location sensing, motion sensing, digital imaging (i.e., a camera), touch screen operation, multimedia playback, data storage, among others, including functionality described in further detail with respect to FIGS. 5, 6, 7, 8, 9A, 9B, and 9C. Accordingly, while certain aspects of mobile device 1100 are shown in FIG. 11 for descriptive purposes, it will be understood that, in different embodiments, mobile device 1100 may include different types of functionality.

As shown in FIG. 11, mobile device 1100 includes a mobile processor 1102 and memory 1130 that may store data and instructions executable by mobile processor 1102. Memory 1130 is shown including mobile OS 1132, which may represent a mobile operating system being executed by mobile processor 1102. Examples of instances of mobile OS 1132 include iOS™ (Apple Inc.) and Android™ (Google Inc.), among others. Also, memory 1130 may store a mobile application (or "app") 1134 for cover music synthesis that may include functionality of at least certain portions of cover music synthesis 500 and user interface 900, among other functionality, that are executable by mobile processor 1102, as described herein. Memory 1130 may also store location data of mobile device 1100, as well as other data, such as data associated with cover music synthesis, as described herein. It is noted that various other apps executing on mobile device 1100 may be configured to access diverse types of functionality included with mobile device 1100, such as, but not limited to, imaging, communication, location-based services, gestures, touch input, motion of mobile device 1100, Internet connectivity, etc. In various embodiments, mobile device 1100 can execute at least certain portions of user application 334 or user interface 900 (see FIGS. 3, 9A, 9B, 9C), and in particular, at least certain portions of AI/ML model functionality associated therewith. For example, mobile processor 1102 can include various types of processors (GPU, NPU, TPU, among others) disclosed above with respect to processor subsystem 320, including processors having on-board AI capability.

In FIG. 11, mobile device 1100 may include at least one instance of a wireless interface 1104, which may provide wireless connectivity to various types of wireless networks, such as cellular telephony networks (e.g., CDMA, GSM, 3G, 4G, LTE, 5G), wireless local area networks (e.g., IEEE 802.11), wireless personal area networks (e.g., Bluetooth®), among others. Mobile device 1100 may include at least one instance of a peripheral interface 1106 for coupling to external devices, such as a universal serial bus (USB) interface, in various embodiments. Display screen 1108 and touch controller 1110 may operate in combination to provide a touch screen display for output to and control by a user. Mobile device 1100 is also shown including at least one instance of a global positioning system (GPS) 1112, which may be used to generate location data. It is noted that in certain embodiments, mobile device 1100 may not include GPS 1112, or may not rely upon GPS 1112 when present, for location data. In certain embodiments, GPS 1112 may be used for digital rights management (DRM), such as for licenses for digital rights that are location dependent.

As disclosed herein, cover music synthesis includes accessing a first digital song specified in a playlist of one or more digital songs, extracting, from the first digital song, first musical parameters characteristic of a music content of the first digital song, receiving a first vocal embedding indicative of a first singer, the first vocal embedding describing speech spoken by or vocals sung by the first singer, and using the first vocal embedding, generating first synthetic vocals for the first digital song using a vocal synthesis model, the first synthetic vocals matching the first musical parameters. The first synthetic vocals can be combined with a first music audio corresponding to the first digital song to generate a first synthetic song.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method for cover music synthesis, the method comprising:
   accessing a first digital song specified in a playlist that includes one or more digital songs;
   extracting, from the first digital song, first musical parameters that characterize music content of the first digital song;
   obtaining a first vocal embedding indicative of a first singer, the first vocal embedding representing speech spoken by or vocals sung by the first singer; and
   using the first vocal embedding, generating first synthetic vocals for the first digital song with a vocal synthesis model, the first synthetic vocals being conditioned on the first musical parameters,
   wherein obtaining the first vocal embedding indicative of the first singer comprises:
   accessing a repository storing a plurality of vocal embeddings, each vocal embedding corresponding to a respective singer;
   applying a clustering algorithm to the plurality of vocal embeddings based on one or both of (i) the first musical parameters and (ii) one or more prosodic parameters used to condition the vocal synthesis model, thereby generating a plurality of clusters of the vocal embeddings;
   selecting a first cluster from the plurality of clusters; and
   selecting, from the first cluster, the vocal embedding corresponding to the first singer as the first vocal embedding.

2. The method of claim 1, further comprising:
   combining the first synthetic vocals with first music audio corresponding to the first digital song to generate a first synthetic song.

3. The method of claim 1, wherein the vocal synthesis model comprises at least one of:
   a variational autoencoder (VAE);
   a diffusion-model denoiser;
   a generative adversarial network (GAN); or
   a transformer-based sequence-to-sequence model.

4. The method of claim 1, wherein the first musical parameters describe at least one of:
   a lyric phoneme sequence;
   harmony;
   melody;
   musical structure;
   musical form;
   temporal dynamics;
   timbre;
   color; or
   orchestration.

5. The method of claim 1, wherein the playlist is stored by a music service, and wherein accessing the first digital song comprises accessing the first digital song via an application programming interface compatible with the music service, the music service providing at least one of music audio or music video.

6. The method of claim 1, further comprising:
   fine-tuning the vocal synthesis model using adaptation data associated with the first singer.

7. The method of claim 2, wherein the first music audio is based on the music content of the first digital song, or wherein the first music audio is generated using a music synthesis model.

8. The method of claim 1, further comprising:

providing a user interface configured to support at least one of:

selecting the playlist;

selecting the first digital song;

viewing or modifying one or more prosodic parameters for the vocal synthesis model, the one or more prosodic parameters including at least one of intonation, pitch, stress, emphasis, rhythm, timing, volume, or loudness;

selecting the first vocal embedding; or selecting the first singer.

9. The method of claim 1, further comprising:

obtaining a second vocal embedding indicative of a second singer; and using the first vocal embedding and the second vocal embedding, generating second synthetic vocals for the first digital song with the vocal synthesis model, the second synthetic vocals being conditioned on the first musical parameters.

10. The method of claim 2, further comprising:

using the first vocal embedding, generating respective synthetic vocals for each of the one or more digital songs using the vocal synthesis model; and combining the respective synthetic vocals with respective music audios corresponding to the one or more digital songs to generate respective synthetic songs.

11. The method of claim 1, wherein extracting the first musical parameters comprises extracting the first musical parameters from symbolic music information representing the music content of the first digital song, and wherein the symbolic music information is used to generate the first music audio.

12. The method of claim 2, further comprising:

registering the first synthetic song with at least one blockchain-based rights management system; and encrypting the first digital song.

13. A system for cover music synthesis, comprising:

one or more processors; and one or more non-transitory computer-readable media storing instructions that, when executed by the one or more processors, cause the system to:

access a first digital song specified in a playlist that includes one or more digital songs;

extract, from the first digital song, first musical parameters that characterize music content of the first digital song;

obtain a first vocal embedding indicative of a first singer, the first vocal embedding representing speech spoken by or vocals sung by the first singer; and generate, using the first vocal embedding, first synthetic vocals for the first digital song with a vocal synthesis model, the first synthetic vocals being conditioned on the first musical parameters, wherein, to obtain the first vocal embedding indicative of the first singer, the instructions further cause the system to:

access a repository storing a plurality of vocal embeddings, each vocal embedding corresponding to a respective singer;

apply a clustering algorithm to the plurality of vocal embeddings based on one or both of (i) the first musical parameters and (ii) one or more prosodic parameters used to condition the vocal synthesis model, thereby generating a plurality of clusters of the vocal embeddings;

select a first cluster from the plurality of clusters; and select, from the first cluster, the vocal embedding corresponding to the first singer as the first vocal embedding.

14. The system of claim 13, wherein the instructions further cause the system to combine the first synthetic vocals with first music audio corresponding to the first digital song to generate a first synthetic song.

15. The system of claim 13, wherein the vocal synthesis model comprises at least one of: a variational autoencoder (VAE), a diffusion-model denoiser, a generative adversarial network (GAN), or a transformer-based sequence-to-sequence model.

16. The system of claim 13, wherein the first musical parameters describe at least one of: a lyric phoneme sequence, harmony, melody, musical structure, musical form, temporal dynamics, timbre, color, or orchestration.

17. The system of claim 13, wherein the playlist is stored by a music service, and wherein access to the first digital song comprises access via an application programming interface compatible with the music service, the music service providing at least one of music audio or music video.

18. The system of claim 13, wherein the instructions further cause the system to fine-tune the vocal synthesis model using adaptation data associated with the first singer.

19. The system of claim 14, wherein the first music audio is based on the music content of the first digital song, or wherein the first music audio is generated using a music synthesis model.

20. A non-transitory computer-readable medium storing instructions that, when executed by one or more processors of a system, cause the system to:

access a first digital song specified in a playlist that includes one or more digital songs;

extract, from the first digital song, first musical parameters that characterize music content of the first digital song;

obtain a first vocal embedding indicative of a first singer, the first vocal embedding representing speech spoken by or vocals sung by the first singer; and generate, using the first vocal embedding, first synthetic vocals for the first digital song with a vocal synthesis model, the first synthetic vocals being conditioned on the first musical parameters, wherein, to obtain the first vocal embedding indicative of the first singer, the instructions further cause the system to:

access a repository storing a plurality of vocal embeddings, each vocal embedding corresponding to a respective singer;

apply a clustering algorithm to the plurality of vocal embeddings based on one or both of (i) the first musical parameters and (ii) one or more prosodic parameters used to condition the vocal synthesis model, thereby generating a plurality of clusters of the vocal embeddings;

select a first cluster from the plurality of clusters; and select, from the first cluster, the vocal embedding corresponding to the first singer as the first vocal embedding.

* * * * *